United States Patent [19]

Dessert et al.

[11] Patent Number: 4,495,582

[45] Date of Patent: Jan. 22, 1985

[54] CONTROL SYSTEM FOR PRE-SETTING AND OPERATION OF A PRINTING PRESS AND COLLATOR

[75] Inventors: Robert A. Dessert; Richard A. Gaspar; Richard T. Laubach; Dinesh G. Punater, all of Dayton; Ralph E. Barrera, Casstown, all of Ohio

[73] Assignee: Harris Graphics Corporation, Melbourne, Fla.

[21] Appl. No.: 385,181

[22] Filed: Jun. 4, 1982

[51] Int. Cl.[3] ...................... B65H 43/00; G06F 15/46

[52] U.S. Cl. .................................... 364/469; 364/518; 101/248

[58] Field of Search ............... 364/468, 469, 470, 471, 364/518, 523; 101/248

[56] References Cited

U.S. PATENT DOCUMENTS

| | | | |
|---|---|---|---|
| 3,249,316 | 5/1966 | Loase | 242/75.44 |
| 3,250,528 | 5/1966 | Loase | 270/73 |
| 3,303,083 | 2/1967 | Hedenstrom | 156/513 |
| 3,304,416 | 2/1967 | Wolf | 235/92 |
| 3,369,436 | 2/1968 | Loase | 83/324 |
| 3,390,823 | 7/1968 | Ott, Jr. | 226/9 |
| 3,398,618 | 8/1968 | Schriber | 83/343 |
| 3,592,133 | 7/1971 | Webendorfer et al. | 101/228 |
| 3,727,908 | 4/1973 | Whitesell et al. | 270/53 |
| 3,831,131 | 5/1975 | Anderson, Jr. et al. | 270/61 |
| 3,912,252 | 10/1975 | Stephens | 270/79 |
| 3,938,437 | 2/1976 | Punater | 101/228 |
| 3,998,141 | 12/1976 | Hsiue | 93/93 |
| 4,082,259 | 4/1978 | Anderson | 270/73 |
| 4,177,730 | 12/1979 | Schriber et al. | 101/248 |
| 4,346,446 | 8/1982 | Erbstein et al. | 364/469 |
| 4,366,542 | 12/1982 | Anselrode | 364/469 |

FOREIGN PATENT DOCUMENTS 2083798 3/1982 United Kingdom .

OTHER PUBLICATIONS

Harris Digiform Computerized Forms Setting System—Brochure.

The Seybold Report, vol. 8, No. 10, Jan. 22, 1979, pp. 10-1 to 10-16.

The Digiform System, publication of Digitized Information Systems Corporation.

The Digiform Way publication of Discorp.

The Schriber 1200 Business Forms Press and Makeready System—publication of Harris Corporation.

Harris 925T High Production Forms Collator—publication of Harris Corporation.

Harris Production Monitor System—publication of Harris Corp.

*Primary Examiner*—Joseph F. Ruggiero
*Assistant Examiner*—A. MacDonald
*Attorney, Agent, or Firm*—Biebel, French & Nauman

[57] ABSTRACT

Process and apparatus for manufacturing multi-part forms uses web presses having printing stations and processing stations at which operations are performed on webs in registry with a series of printed images, and uses a collator to assemble related webs from said presses, and to perform additional operations on assembled webs in registry with images thereon. A digital job description of a form is created, including location of printed images on several parts of the form and location of process items, e.g. perforations, holes, or cuts on parts of the form. This job description is stored in the memory of a computer [PR-2] with a job identifying code. Also, a digital description is created of images to be printed on the form, and stored in memory with the job identifying number. The image descriptions are recalled from memory and used to create printing plates for the presses and to pre-set printing and processing sections of a press for each part of the form. The parts of the form are then produced on the presses and supplied to the collator. The job description is recalled from memory and used to pre-set stations of the collator to assemble and complete processing of the multi-part forms. The computer also gathers and stores management data as the presses and collator operate, keeps a record of supplies/tools needed for each job and makes this information available to operators through terminals, and maintains records of jobs entered, work in process, and jobs shipped.

26 Claims, 26 Drawing Figures

FIG-7A

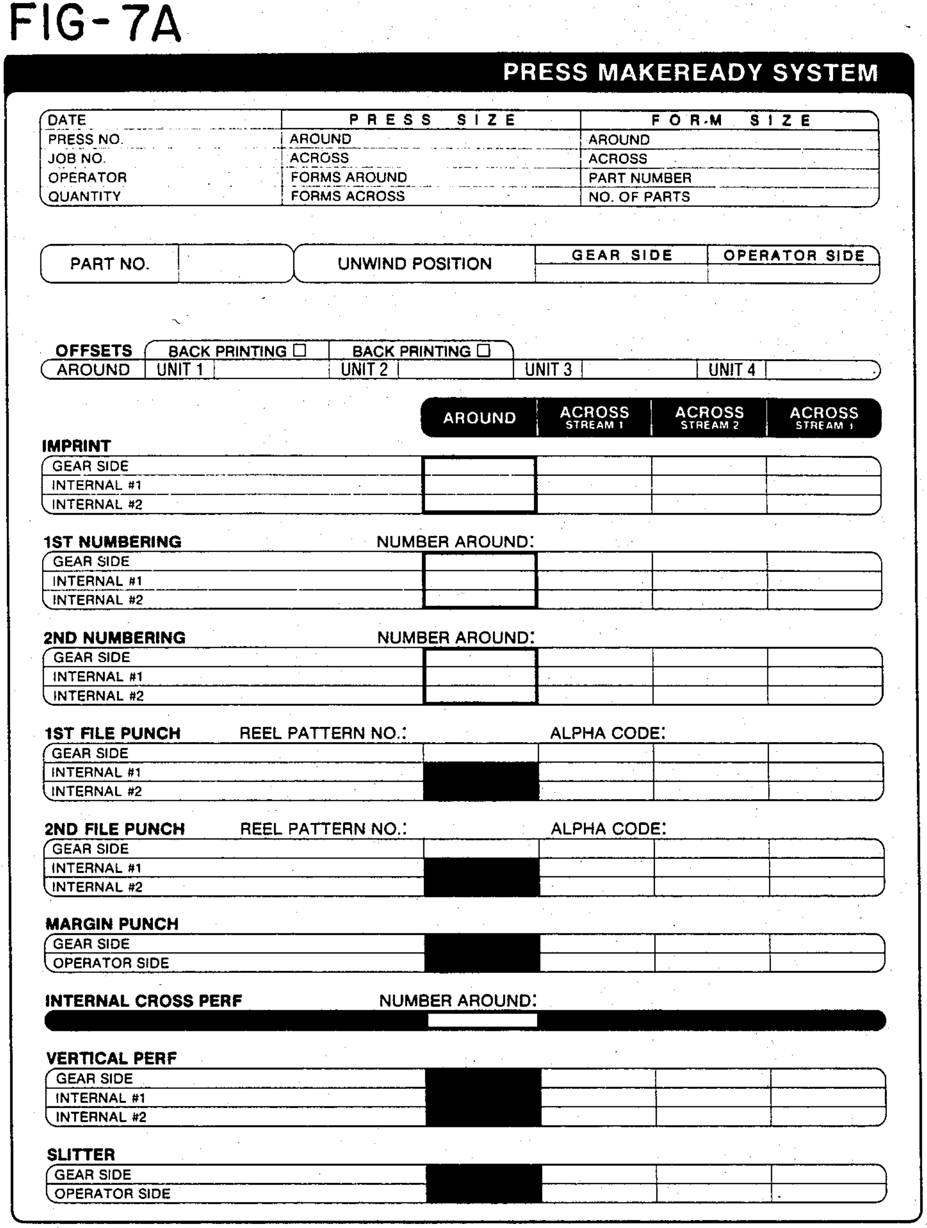

PRESS MAKEREADY SYSTEM

| | PRESS SIZE | FORM SIZE |
|---|---|---|
| DATE | | |
| PRESS NO. | AROUND | AROUND |
| JOB NO. | ACROSS | ACROSS |
| OPERATOR | FORMS AROUND | PART NUMBER |
| QUANTITY | FORMS ACROSS | NO. OF PARTS |

| PART NO. | | UNWIND POSITION | GEAR SIDE | OPERATOR SIDE |
|---|---|---|---|---|
| | | | | |

| OFFSETS | BACK PRINTING ☐ | | BACK PRINTING ☐ | | | | | |
|---|---|---|---|---|---|---|---|---|
| AROUND | UNIT 1 | | UNIT 2 | | UNIT 3 | | UNIT 4 | |

| | AROUND | ACROSS STREAM 1 | ACROSS STREAM 2 | ACROSS STREAM 1 |
|---|---|---|---|---|
| **IMPRINT** | | | | |
| GEAR SIDE | | | | |
| INTERNAL #1 | | | | |
| INTERNAL #2 | | | | |
| **1ST NUMBERING** NUMBER AROUND: | | | | |
| GEAR SIDE | | | | |
| INTERNAL #1 | | | | |
| INTERNAL #2 | | | | |
| **2ND NUMBERING** NUMBER AROUND: | | | | |
| GEAR SIDE | | | | |
| INTERNAL #1 | | | | |
| INTERNAL #2 | | | | |
| **1ST FILE PUNCH** REEL PATTERN NO.: | | ALPHA CODE: | | |
| GEAR SIDE | | | | |
| INTERNAL #1 | | | | |
| INTERNAL #2 | | | | |
| **2ND FILE PUNCH** REEL PATTERN NO.: | | ALPHA CODE: | | |
| GEAR SIDE | | | | |
| INTERNAL #1 | | | | |
| INTERNAL #2 | | | | |
| **MARGIN PUNCH** | | | | |
| GEAR SIDE | | | | |
| OPERATOR SIDE | | | | |
| **INTERNAL CROSS PERF** NUMBER AROUND: | | | | |
| **VERTICAL PERF** | | | | |
| GEAR SIDE | | | | |
| INTERNAL #1 | | | | |
| INTERNAL #2 | | | | |
| **SLITTER** | | | | |
| GEAR SIDE | | | | |
| OPERATOR SIDE | | | | |

FIG-7B

COLLATOR MAKEREADY SYSTEM

DATE
PRESS NO
JOB NO
OPERATOR
QUANTITY

COLLATOR SIZE
AROUND
ACROSS
FORMS AROUND
FORMS ACROSS

FORM SIZE
AROUND
ACROSS
PART NUMBER
NO OF PARTS

PART NO.

PAPER ROLL POSITION — GEAR SIDE

CARBON ROLL POSITION — GEAR SIDE

PIN BAND
UNIT 1 UNIT 2

| | PARK | AROUND | ACROSS STREAM 1 | ACROSS STREAM 2 | ACROSS STREAM 3 |
|---|---|---|---|---|---|
| **GLUE NOZZLES** | | | | | |
| GEAR SIDE #1 | | | | | |
| #2 | | | | | |
| GEAR SIDE #1 | | | | | |
| #2 | | | | | |
| GEAR SIDE #1 | | | | | |
| #2 | | | | | |
| **CRIMP WHEELS** | | | | | |
| GEAR SIDE #1 | | | | | |
| #2 | | | | | |
| **SCHRIBER-LOC** NUMBER AROUND: | | | | | |
| GEAR SIDE #1 | | | | | |
| #2 | | | | | |
| **NUMBERING** | | | | | |
| GEAR SIDE #1 | | | | | |
| #2 | | | | | |
| **FILE PUNCH** REEL PATTERN NO.: ALPHA CODE: | | | | | |
| GEAR SIDE #1 | | | | | |
| #2 | | | | | |
| **VERTICAL PERF** | | | | | |
| GEAR SIDE #1 | | | | | |
| #2 | | | | | |
| **SLITTER** | | | | | |
| GEAR SIDE #1 | | | | | |
| #2 | | | | | |

CROSS PERF/CUT OFF NUMBER AROUND:

CONTROL SYSTEM FOR PRE-SETTING AND OPERATION OF A PRINTING PRESS AND COLLATOR

BACKGROUND OF THE INVENTION

This invention pertains to web processing machines in general and more particularly to making ready printing presses and collators. Depending upon the type of press and the type of printed matter produced, makeready time (i.e. press set up time) becomes an important overall cost factor. There is a segment of the printing industry that is devoted primarily to the design, manufacturing and sale of business forms, and there are corresponding types of equipment which are unique to the business forms industry. The problems associated with making ready a business forms press are significantly amplified over those associated with other types of presses, primarily because of additional operations performed by such business forms presses. Since the makeready functions associated with the business forms press are the most complex, the invention will be described in the context of a makeready press, but will also have application to other type of presses. Many of these makeready functions are also present in preparation of a collator, which assembles the webs printed on these presses, and often performs mechanical operations alternately with the press. In the United States, there is an association devoted to this business known as the National Business Forms Association, located in Alexandria, Virginia, which has published a handbook known as The Business Forms Handbook (2nd Ed., copyright 1979), which is devoted to various aspects of the business forms industry.

In general, a form is designed to facilitate the handling and recording of various business transactions, internal or external to a company, with a view to prompt the user to accumulate and record whatever information is necessary for the transaction involved, and, if necessary, to duplicate this information on a number of copies for routing or record keeping purposes. The design of forms is covered in detail in the aforementioned handbook, and as is commonly known in the industry, there are also certain standard forms which have been developed and are used by many manufacturers and suppliers in this industry for particular job applications.

Business forms typically are categorized into two general types, unit sets and continuous forms. Unit sets are individual form sets with parts held together by a detachable glued stub or edge which is designed for easy separation. Styles of unit sets are divided into stock forms, custom printed forms and tabulating card sets. At this time, the most common are the custom manufactured unit sets. These forms have the advantages of saving handling, and reducing non-productive labor, they may be written either by hand or machine, or both, and they have many construction features which may be utilized, for example the forms of the set, or parts of them, may be sectioned, parts may be removable as single parts or portions thereof, etc. Unit sets are convenient and clean to handle, since if interleaved carbon paper is used the forms can be snapped apart without touching the carbon. Of course, if no-carbon paper is used this is not a problem. Unit sets are useful both for intermittent and regular work, and they have the advantage of not needing any special feeding attachments for typewriters, printers or other machinery used in entering on the forms. Also, a special part can be included in the sets, e.g. a duplicating master, safety paper, and transparent or translucent parts. The unit set form provides accurate registration within the set, it is easy to use, and thus training in its use is fast and simple.

Continuous forms are also sometimes known as "strip forms", and encompass continuous tabulating cards, fanfold forms and autographic register forms. The types of continuous forms are generally divided into stock forms, imprinted forms and custom design forms. They are traditionally designated by a measurement which states first the width and then the length, e.g., WxL. Continuous forms provide accurate part-to-part, line-to-line, and set-to-set registration. Controlling the handling of continuous forms with line holes, as is usually the custom, avoids the slipping out of registration of the various parts. Continuous forms are easy to use, can be written faster, particularly by continuous printers or the like, and consecutive numbering is preserved; sets can't be mixed accidentally. Also, continuous forms are capable of being manually or mechanically decollated and burst.

Thus, a typical forms manufacturing plant will have the capability to manufacture and merchandise both unit sets and continuous forms, with a predominance in one or the other type depending upon the types of business that the plant serves and the desires, to some extent of its customers.

The typical forms manufacturing plant involves functions not unlike a commercial printing plant. For example, the cycle may commence with a sales person contacting a customer and making an estimate to that customer. As part of the estimate, the nature and design of the form will be identified, and if the form is not a standard one, or a variation of a standard one, in most instances the estimate will include some example or layout. Following submission of the estimate there may be interaction between the sales person and the customer possibly including modification of the form design, or the quantity involved, but if all goes well the company will be given an order by the customer, at which time the job will be assigned a job number.

From the beginning of this process, there are certain types of information already available that will be pertinent to the job throughout the manufacturing and shipping portions of the job cycle. For example, the name and address of the customer, the shipping address if different, identification of the sales person and of the contact person at the customer, size and configuration of the form, color of parts, any special art work, etc. all are identified and can be recorded early in the process. This data can best be utilized if it is thereafter available quickly for checking, reuse, or addition to it, without repeated entry of the information.

Once an order is entered, the plant personnel must then schedule the job, make certain that the proper supplies are available, or order whatever additional supplies are needed, and prepare a schedule and routing of the job through the various departments (and their functions) within the plant.

This will usually involve the use of a form, and perhaps a folder or envelope, which moves through the departments as the job progresses. A typical job will require the preparation of one or more printing plates, and thus one of the first tasks to be performed will be typesetting and photocomposition, the product of which is then passed to the plate making department where the necessary printing plates are manufactured. Alternately the plates can be made directly through laser plate making apparatus.

The plates then are grouped with a job instruction sheet which identifies for the press operator the various measurements and settings that he needs to run the job. He will use these for setting up the press, but first it is necessary to assure that the proper type and supply of paper, ink, and related equipment such as perforating or slitting blades, numbering machines, possibly special punches and dies, are all available to the press operator. Then, with all of this information and material gathered, the press operator begins the job first by setting up the press, normally called makeready, following which he may run a small number of impressions, have them checked by his foreman for accuracy and compliance with the order requirements, after which the press will proceed in the running or productive mode until the required number of forms have been prepared. Because of a trend toward shorter run lengths, minimizing waste in this makeready procedure becomes more important. Depending upon the size or design of the form, the required number may either equal, or be a sub-multiple of the number of impressions performed by the press.

If the job requires a multi-part form, normally the product of the above described run will be rewound onto a roll, and the next part or parts of the form for the particular job will be printed, either subsequently on the same press, or perhaps on another press if it is available. There may be three or four different such rolls required, depending upon the number of parts of the form. In the case of a multi-part form, the finished rolls will then be transported to a collator where they will be assembled, perhaps further mechanical work may be done on the assembled forms such as cross-perforating or slitting, and the end product multi-part form will be folded in zig-zag fashion or batched, packaged, and delivered to the shipping department for addressing and shipment to the customer.

In the case of single part forms, the end product of the press, as mentioned above, may be folded, or divided into sheets, as it is delivered from the press, and then taken to the shipping department.

During all of this procedure, much of the job information will follow the order through the plant, will be recalled all or in part at various stages of the manufacturing procedure, even at the final shipping function where it will be necessary to prepare a shipping label, perhaps prepare an invoice, and instruct the shipper as to routing or delivery As can be seen, the documentation included in progressing a job from beginning to end can be significant, and is subject to errors, resulting in possible waste or unnecessary time delay or missed delivery schedules, or cost overruns. A significant portion of job costs result from makeready time along with paper waste in setting the press or collator for final production. Further delays are possible in the event that materials or tools are not available or mislaid etc. when a job is scheduled for production, further costing undesirable down time. All of these factors impact the profitability of a printing press. Improved efficiency can be achieved if misinterpretation or errors in the job identification are minimized. The ability of a computer to store, recall, display on a terminal, to modify or expand upon the job data base is particularly useful in assuring smooth and properly scheduled handling of the entire sales, manufacturing, accounting, and shipping functions which all are necessary to the prompt and profitable completion of jobs in a business forms manufacturing establishment. Further efficiency can be achieved by automation in the press and collator to reduce labor cost, down time and errors. All of this can be combined with the other functions required of a printing operation to provide a smooth transition of jobs from beginning to end.

SUMMARY OF THE INVENTION

The present invention provides a process and apparatus for manufacturing multi-part forms using web presses having printing stations and processing stations at which operations are performed on webs in registry with a series of printed images, and using a collator to assemble related webs from said presses and to perform additional operations on assembled webs in registry with images thereon. A digital job description of a form is created, including location of printed images on several parts of the form and location of process items, e.g. perforations, holes, or cuts on parts of the form. This job description is stored in the memory of a computer with a job identifying code or number, and includes a digital description of images to be printed on the form, stored in memory with the job identifying number.

The image descriptions are recalled from memory and used in conjunction with an editing terminal and appropriate software to create printing plates for the presses and to pre-set printing and processing sections of a press for each part of the form. The parts of the form are then produced on the presses and supplied to the collator. The job description is recalled from memory and used to pre-set stations of the collator to assemble and complete processing of the multi-part forms. The computer also gathers and stores management data as the presses and collator operate, keeps a record of supplies/tools needed for each job and makes this information available to operators through terminals, and maintains records of job entered, work in process, and jobs shipped.

On each press, and on the collator, microprocessors are provided with communication links to the computer. The consoles of these machines include controls for receiving messages containing makeready information and other data in the job description. Thus the operators have available to them, in addition to plates and printouts of parts of the job descriptions, the content of the stored job description and the ability to preset their machine during makeready operations merely by calling up the job description message to the microprocessors and related equipment. The various elements of the press are pre-set automatically, although under operator supervision. However, the operators have the ability, through appropriate manual inputs, to modify the setting as necessary.

Digital displays are driven from the microprocessor controls, and are located adjacent the various machine stations as well as at the control console, to inform the operator as to the settings of adjustable elements of the machines with respect to predetermined circumferential and lateral reference (zero) positions.

In a more comprehensive aspect, the invention is directed to a forms printing plant incorporating computer control and management with an integrated data base and terminals located throughout the plant to bring information related to any job quickly to the attention of appropriate personnel. Typical locations of such terminals are in different areas devoted to management, sales and estimating, accounting, composition, manufacturing including plate making, printing and collating, and stores related to these for supplies and tooling, and in receiving and shipping. Personnel can call up the same description and related information pertaining to any job from the integrated data base. This minimizes chances for error in transcription and considerably smoothes the flow of work through the plant.

The primary object of the invention, therefore, is to provide a forms manufacturing process and apparatus as above set forth; to provide such a process and apparatus in a plant where job descriptions are created and stored in an integrated data base of a computer, and used to produce printing plates, makeready the machines, specify supplies and/or tooling required, monitor the progress of the job through the plant, produce management data (including scheduling) relating to the above, and in general unify the forms manufacturing operation, minimize waste of time and materials, thereby improving productivity of the plant.

Other objects and advantages of the invention will be apparent from the following description, the accompanying drawings and the appended claims.

BRIEF DESCRIPTION OF THE DRAWINGS

FIGS. 7A and 7B show a typical forms on which press and collator makeready data is printed;

DESCRIPTION OF THE PREFERRED EMBODIMENT

Figure 1:
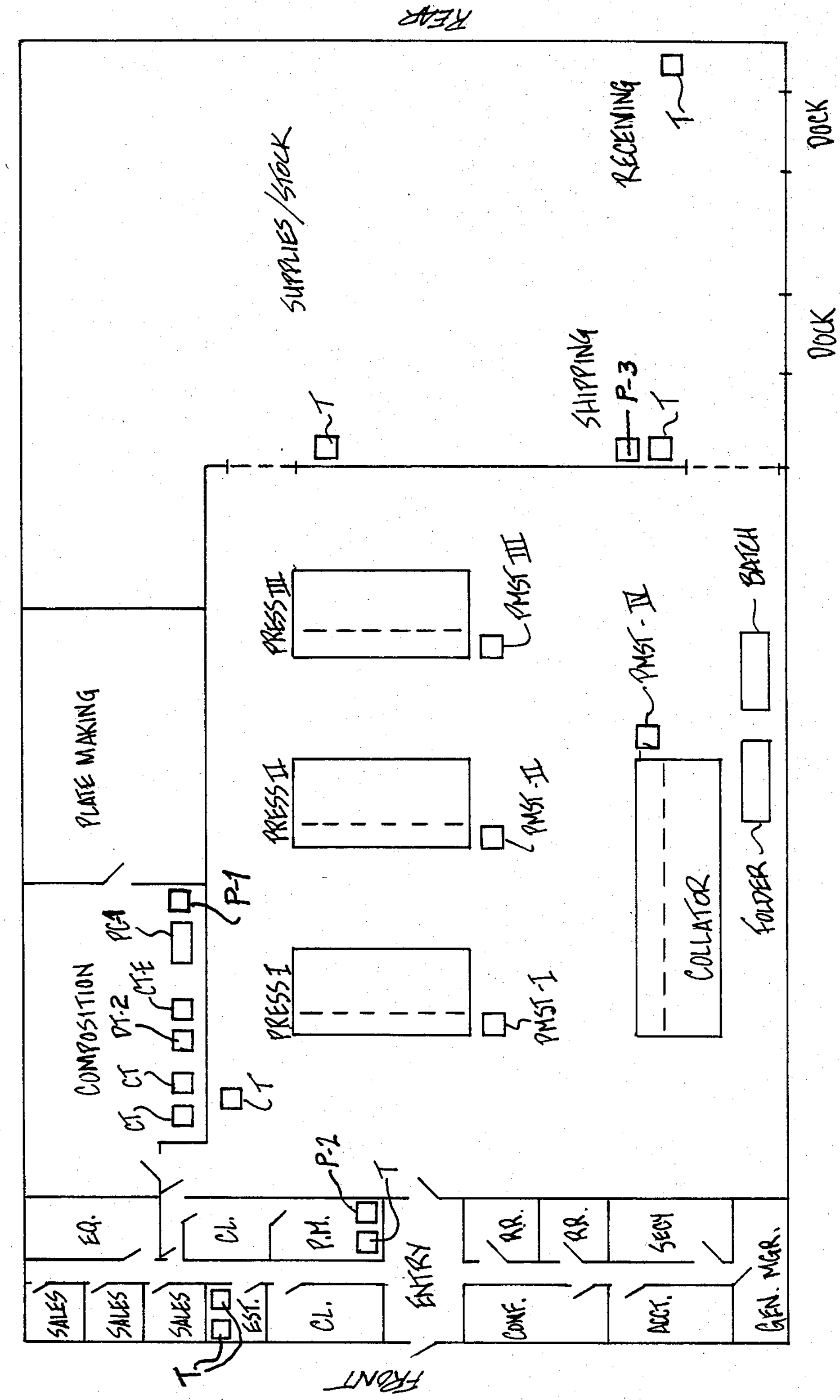
FIG. 1 is a plan layout of a business forms manufacturing plant.
Figure 2:
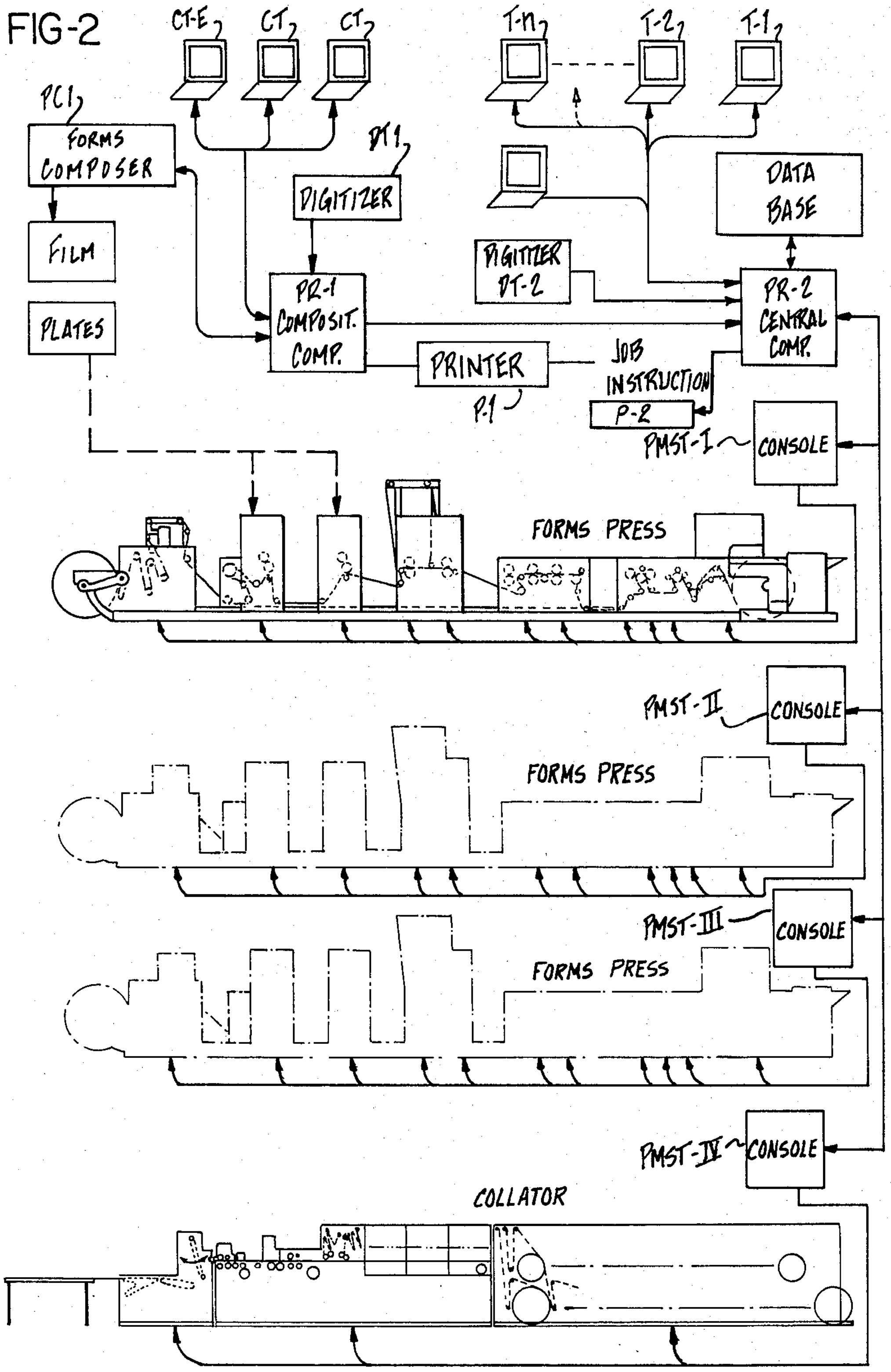
FIG. 2 is a schematic diagram of the data processing and control system for the plant.

FIG. 1 is a floor plan of a typical single floor manufacturing plant devoted primarily to the production of business forms. The front of the building includes office space for management, accounting, a conference area for dealing with customers, a sales and estimating department, the office of the production manager and office space for supporting clerical staff, and office equipment, as well as the floor space for much of the data processing equipment which is part of the present invention. Immediately behind this frontal space the central area of the plant is divided into two relatively smaller rooms, one devoted to the composing staff and its equipment, the other devoted to the plate making staff and equipment, and the major part of the central area which houses the printing production department. In the typical arrangement shown, there are three forms presses arranged side by side designated Press I, II, and III, and one collator C arranged opposite the presses. The presses are shown in FIG. 2 and are provided with re-wind apparatus at their delivery, but can be fitted optionally with a zig-zag folder or a sheeter-delivery stacker. A typical such press is shown in U.S. Pat. No. 4,177,730. The collator is provided alternatively with a folder for producing zig-zag folded output of multi-part continuous forms, or a batch delivery apparatus which is used to deliver unit set forms from the collator. A typical folder is shown in U.S. Pat. No. 4,082,259 issued Apr. 4 1978 or 3,912,252 issued Oct. 14 1975, and a typical batch delivery apparatus is shown in U.S. Pat. No. 3,998,141 issued Dec. 21 1976, all of which are assigned to the assignee of this application.

The rear area of the plant is devoted to stores, e.g. supplies, tools, paper stock, ink, and all the other materials and consumable type items which are required in the forms manufacturing process. The rear area is also subdivided into a receiving area and a shipping area, for each of which there preferably is a loading dock as shown.

FIG. 2 is a schematic diagram of the overall arrangement of a data processing and control system for the plant, as provided by the present invention. At the upper corner of the diagram there are shown a number of video terminals with the general designation "CT", these terminals being connected to a first electronic processor PR-1, for example a microcomputer such as DEC PDP 11/23, provided with a printer P1 which can be used, among other things, for the production of hard copy job instructions which are also so designated on the diagram. Also inputting the microprocessor PR-1 is a digitizing apparatus DT1 which can function to reduce art work and the like into digital information for input to the composition processor PR-1. This information consists of a digital description of the form and makeready data necessary to preset the press and collator on which the form is to be manufactured. The processor PR-1 has two other outputs, the first of which transmits data to a photocomposing device PC1 which is used in the composition department to produce films (transparencies). These are utilized in the plate making department to manufacture printing plates, usually offset lithographic plates. The output of the photocomposing device is thus shown schematically as a plurality of films which are routed to a plate maker, so designated on the diagram, with the plates resulting from this operation being eventually installed in the lithographic printing units of one or more of the presses, as indicated by the flow lines on the diagram. Optionally, the films can be sent to an outside plate making operation. Also, the output of the photocomposing device can be used to drive a laser plate making apparatus (not shown) to expose the plates directly.

Another output of the processor PR-1 leads to a second larger processor PR-2, which is a multi-purpose electronic data processing device such as a DEC PDP 11/44, or a Harris Model 500. The capacity of this processor PR-2 will depend upon the number of operations that it must perform and attend. Although two computers are shown it should be understood that the operations of both can be accomplished by a single computer depending upon cost considerations and complexity of the system.

An optional unit for the production of press and collator makeready data is a device which functions to digitize the information from an existing form, either a standard form, artwork for a single copy of a job, or a copy of a job previously run. This includes a separate digitizer DT2 and terminal TDT, preferably located in the composition department, which utilizes a printer P2 for generating additional hard copy job instructions, and another output through which certain of the job instructions may be transmitted in digital form to central computer PR-2.

Referring back to FIG. 1, input terminals may be conveniently located, by way of example, in the sales and estimating department (one or more terminals), in the accounting department, in the office of the production manager, in the shipping area, and perhaps in the receiving area (these might share one terminal). The digitizer DT2, the photocomposing apparatus PC1, its digitizer DT1, additional terminals CT and an editing terminal CT-E will be located in the composition department, and of course the plate making apparatus will be physically located in the plate making department.

Additional terminals T-1, T-2 . . . T-N may be located at a convenient point within the manufacturing department, for example somewhere on the press floor where it can be accessed by the press room foreman.

Figure 6:
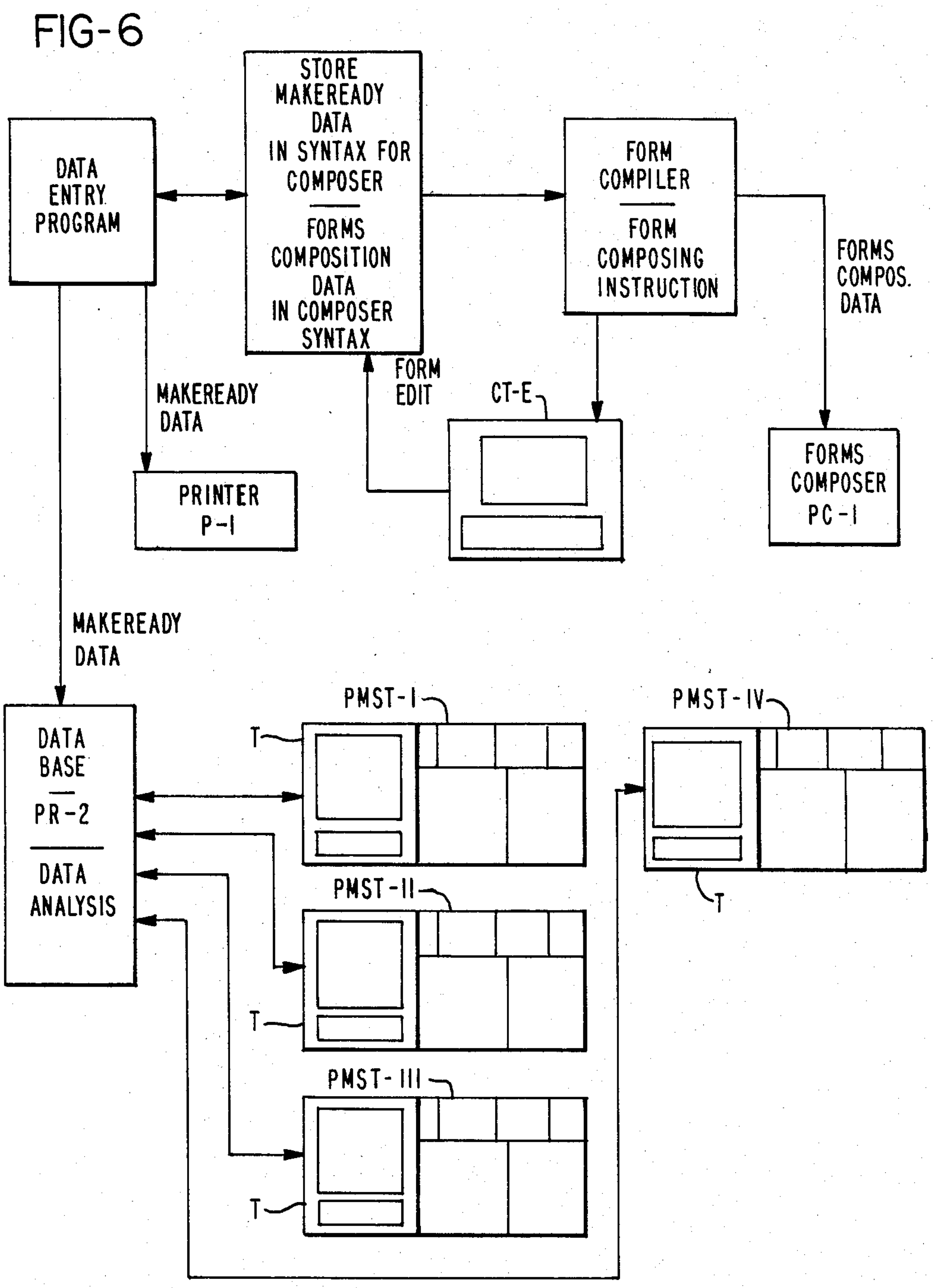
FIG. 6 is a block diagram of the data entry and handling system together with the forms composing apparatus.
Figure 16:
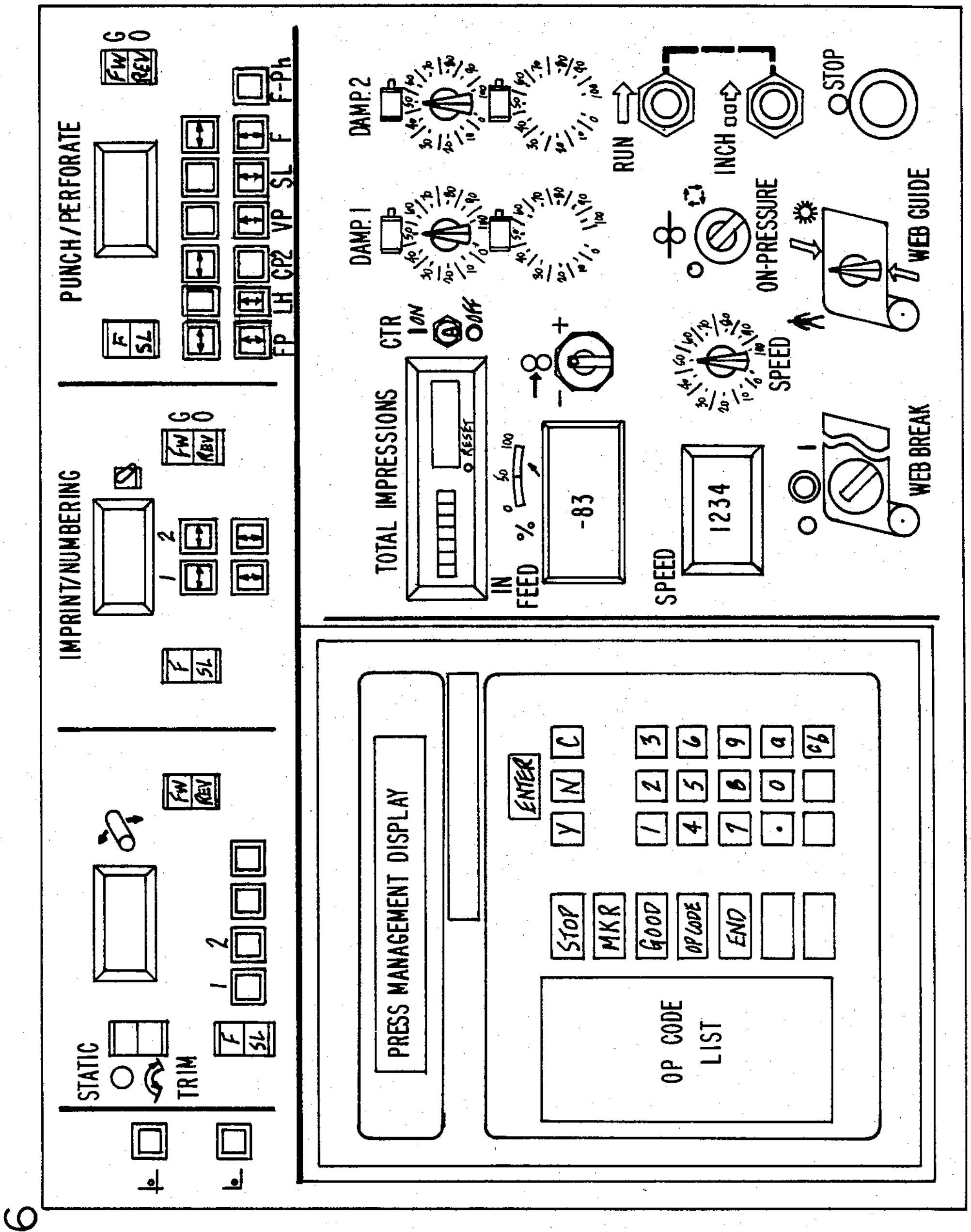
FIG. 16 is a drawing of a press control panel, omitting the associated terminal.
Figure 25:
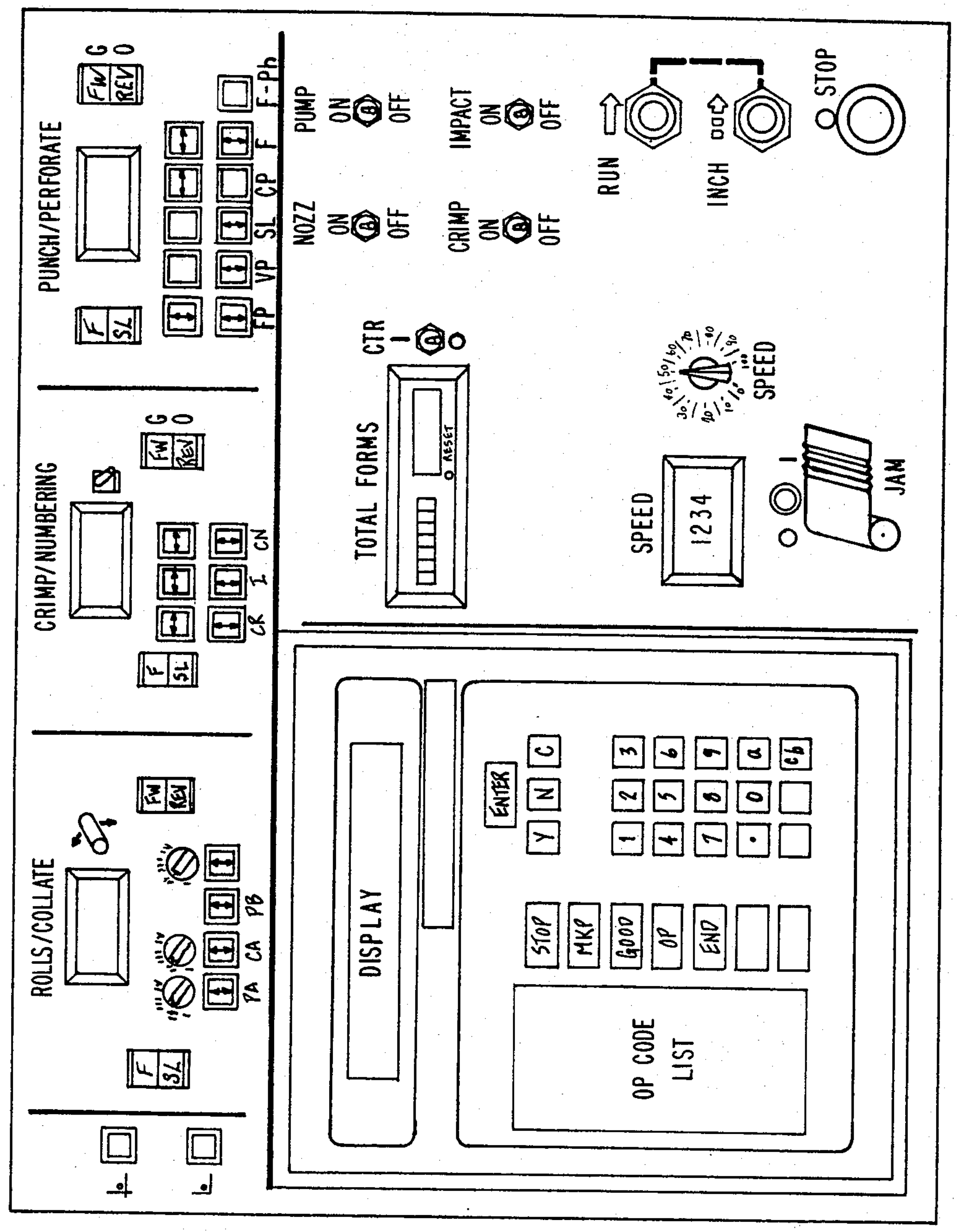
FIG. 25 is a drawing of a collator control panel.

Outputs from the main processor PR-2 are directed via operator consoles to microprocessor controllers at each of the presses and at the collator. The general arrangement is shown in FIGS. 1, 2 and 6, with the consoles designated PMST-I . . . PMST-IV each located at a corresponding piece of apparatus, with associated terminals of the group T-1, T-2, etc. FIGS. 16 and 25 show in greater detail the consoles at one of the presses and at the collator, omitting the associated terminal. With this console the operator is provided controls which permit him to start and stop the press, indicate the beginning of a job, beginning of makeready, the beginning of useful production at the end of makeready, and to enter various code designations which identify reasons for delay, etc. in the operation of a job. The operator console includes an alpha/numeric display device which provides a means for communicating to the operator prompts for his entering of information, and various other messages, as well as a verification display of information which he has entered through the console keyboard. This console is duplicated at each of the presses, and a similar console is provided at the collator, these being part of the microprocessor controller which is connected via a two way data line with the central computer PR-2.

Figure 4:
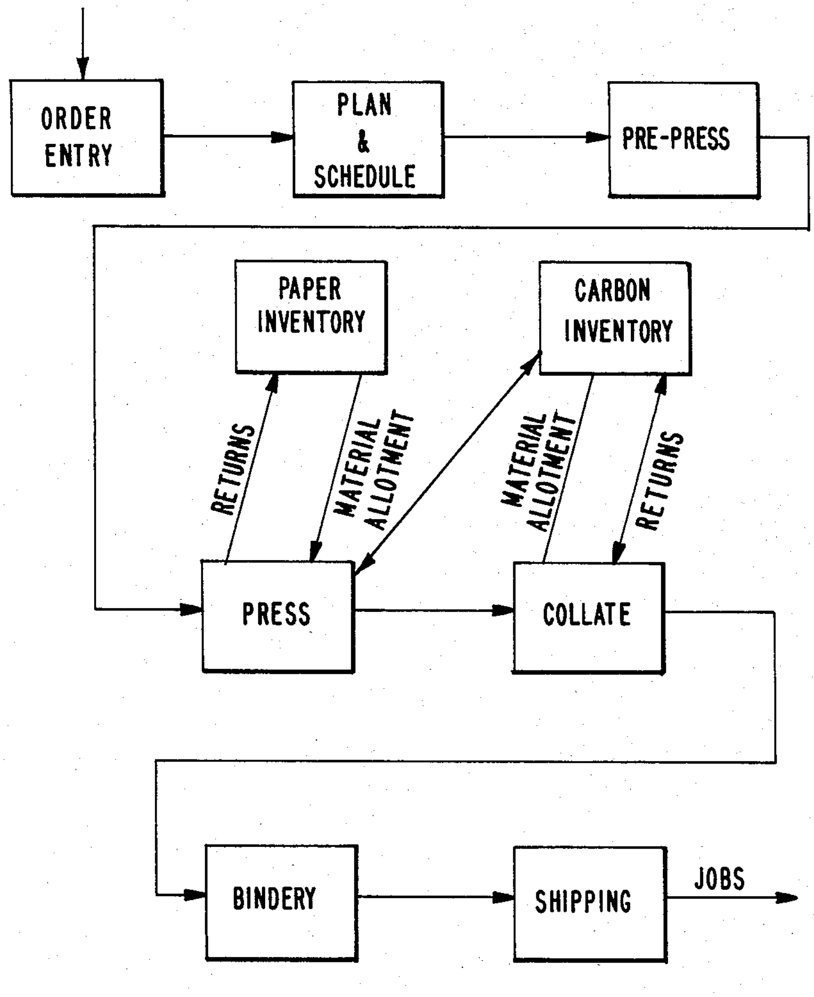
FIG. 4 is a block diagram of the functions of a typical plant.
Figure 5:
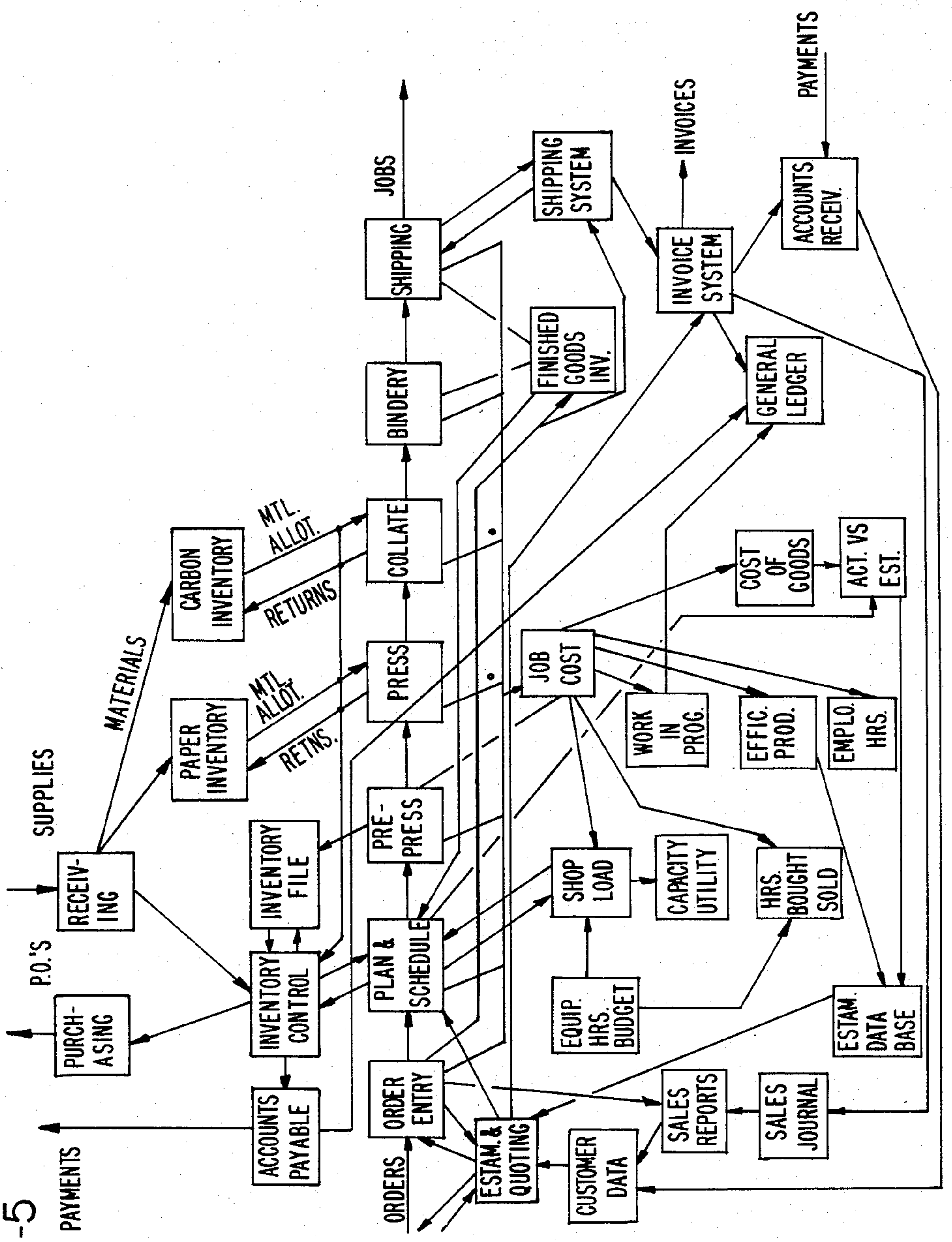
FIG. 5 is an amplified diagram showing data paths and material flow.

FIG. 4 is a block diagram which shows the relation of the functions of a typical plant, showing the progress of a job from the order entry stage through shipment to the customer. FIG. 5 is a substantially amplified block diagram in which the major systems of (1) estimating and quoting, (2) inventory control, (3) shop loading, (4) job cost or control, (5) finished goods inventory and shipping, and (6) inventory, are listed along with major data paths. Many minor systems are omitted or not shown in detail, including most accounting systems supporting the general ledger, payroll, sales and market analysis, and financial analysis. However, FIG. 5 provides an overview in one sheet of the typical information or data that is processed in a plant of this type. Data is preferably stored in an integrated data base which is accessed by the various programs through a data base management system.

It should be understood that computer based systems for the handling of management data, including some visual assistance in the area of press makeready are per se known. Harris Corporation, Business Forms System Division, Dayton, Ohio offers a Production Monitor System (PMS) for automatic data gathering and production/time/material reporting, intended specifically for forms presses and collators. Also the Web Press Division of Harris Corporation, Westerly, Rhode Island, offers a more sophisticated such system for large multi-color web presses. This system is disclosed in U.S. Pat. application Ser. No. 133,770 filed Mar. 25, 1980, entitled Management Analysis System for Web Machines and the Like, now U.S. Pat. No. 4,346,446, issued Aug. 24, 1982.

TYPICAL MULTIPART FORM

Figure 3:
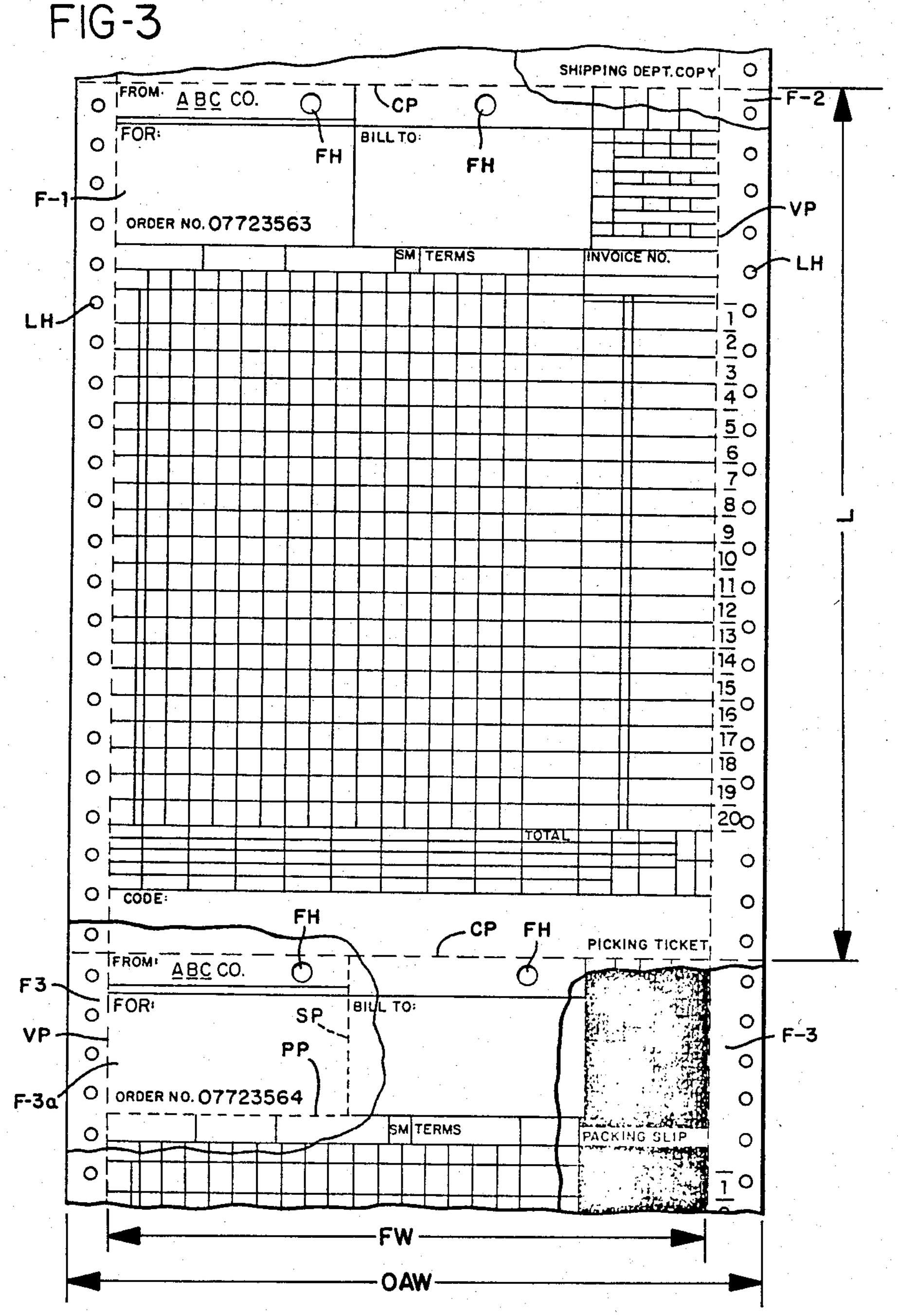
FIG. 3 is a drawing of a continuous three-part form, the quantity production of which is representative of a job to be performed in the plant.

FIG. 3 shows a typical multipart business form which is the product of such a plant. The material used may be different colors or paper stock, and may be either of the "no carbon" type, or the form parts may have sheets of disposable carbon paper (not shown) interleaved between them. The assembly of the separate parts of the form and the carbon paper (if used) is accomplished on a typical collating machine such as shown in U.S. Pat. No. 3,303,083, and as later described herein.

The typical form comprises three parts, the top or original F1, which may be printed for example on white paper; the first copy F2, which might be printed on a web of colored paper, and might be an instruction copy for a shipping department; and F3, the third part, which may be printed on yet a different color of paper, and may typically be a packing slip. In the form shown, the identification of the addressee on form F3 may be a removable ticket F3*a* which can be used for a shipping label, being separated from the packing slip F3 when the package to which the form pertains is shipped to a customer.

The continuous forms are separated from each other by cross perforation lines CP, the forms are provided with file holes FH for convenience in filing some or all of the parts of the form according to the preference of the user, and the marginal portions have line holes LH, which may be used to feed and register separate parts of the form through the collating apparatus which assembles them, and also may be used to feed the assembled multipart form through various devices such as computer printers, autographic registers, etc.

The marginal parts of the forms are separated from the body of the form by vertical perforations VP, such that these marginal parts may be removed from the form in its final use. The shipping ticket F3*a* is outlined on form F3 by partial perforation lines SP and PP, which intersect the cross perforation line CP, and the vertical separation line VP, to define the ticket which may be removed from the form F3. Each form is provided with a unique order number, corresponding on all three parts of the form, and one copy of the form, for example part F3, may be imprinted or overprinted to obliterate information which appears on the other parts, but is unimportant or undesired on one of the form copies. Such imprinting is indicated on form F3 by the darkened mottled area. On any of the parts of the form, areas such as particular columns, particular lettering or designs, etc., may be printed in different colors, either for the purpose of design/appearance, or in order to set out some particular column of information by reason of its importance on the final form.

In a typical forms press 8.5 in.×11 in. (U.S. correspondence size) forms would be printed two across and two around, e.g. four forms to a single image in the print stations.

FORMS COMPOSING SYSTEM

With reference to FIG. 1, the composition room includes terminals which allow for the entry and checking of information which is processed to prepare the necessary instructions and film transparencies for the manufacture of one or more printing plates used to produce the required form or form set. The computerized forms setting system is per se known, being commercially available from Harris Corporation, assignee of this application, under the name "Digiform Composition System" and trademark Formsetter. An earlier version of the system is disclosed in The Seybold Report, Vol. 8, No. 10, pages 5–11, a publication of SEYBOLD PUBLICATIONS, INC., Media, PA 19063. The entry devices include terminal CT of which there may be more than one, utilized to enter a complete description of the desired form. In addition, a digitizer DT-1 is also available for the purpose of entering form coordinates into the instructions for manufacturing the form. In addition, there is a graphic display terminal CT-E which provides on its display screen a visual representation of the form.

Details such as rule weights, density of screens, type styles and sizes, are provided to the terminal operators who use this information to describe the form to the system. It is possible to utilize more than one input terminal simultaneously, with each terminal operator entering complete form data including all parts, screens, color and typography. The form can be viewed on the display terminal CT-E to verify accuracy and to note any changes which may be required. A hard copy printer P-1 is also available in this area, for the purpose of preparing the physical makeready information forms such as FIG. 7A. The films are produced by a special form of phototypesetting device, which is indicated at PC-1, and which is capable of producing on film the lines, rules, text and other printed matter, that make up the form. The product of the phototypesetter can be positive or negative film, or paper copy, as may be desired.

The principal encoding software program for this system is known as the Digiform program, and is available with the apparatus. It provides for encoding of lines, text characters, and screened areas used in the composition of business forms. It also contains ability to perform many step and repeat functions for increased efficiency, and commonly used techniques such as text justification, underlining, leadering, kerning, reverse leading, and color separation. The language also provides for processing of this encoded information into a machine readable format which can be executed on a specifically designed Formsetter.

Several support software programs are also commercially available. These are:

List Program, lists the entire file or selected portions, with the ability to separate text from command codes for proof reading;

Area Move Program, allows interaction with the graphic display terminal CT-E; selected portions of the form composition can be moved about or changed by cursor direction; Archival Program, provides for orderly storage of forms on magnetic discs or the like for future reference;

Optimization Program, organizes the input instructions into the most efficient commands for the form phototypesetter to compose the form using the least number of sets;

Data Transmission Program, is used with telephone data communications in the event that remote input terminals are to be used; and Digiform Administration Program, provides operating statistics for the forms preparation department. Digiform Makeready Program, provides for entering press and collator makeready data during forms composition.

In a typical such machine it is possible to compose forms up to twenty inches by twenty inches, to provide "rules" in solid, broken, dotted, screened or double lines, and to have the capability to select up to eight text character discs of 448 characters each, available in sizes from 4 point to 32 point.

The films, together with appropriate instructions, are forwarded from the composition department to the plate making department, where the plate or plates necessary to print the visual information of the forms are prepared. It is possible, of course, to obtain the plates from an independent plate making service if the plant does not encompass the equipment and personnel for the plate making function. In any event, the necessary plates along with the job instructions from the printer constitute the physical material which is eventually routed to the production manager and by him to the press operators. The information for pre-registering the press or presses and the collator during makeready is all compiled and stored in memory under the associated job number, where the information is available as a message to the presses or collator.

The digitizer DT-2 may cooperate with the terminals T-DT as shown in FIG. 2, and this device is intended to be used with final art work or with a sample form, as in the case of a form to be duplicated, in order to scan over the art work or form laid out in a predetermined position on a table or the like. The movement of the scanning device and the location of its target causes the generation of digital information in x - y coordinate fashion, which identifies the location of various items on the form. Such a device is disclosed in U.S. Pat. No. 4,177,730 at FIG. 5. The output of the digitizer DT-2 is transmitted to the central computer PR-2, the messages containing this information being the same as the messages from the forms composer PC-1.

The message format contains two parts, a mode code and an optionally attached data string. A typical message will include first a synchronization message which assures that the next message will be accepted by the protocol handler at the receiver (e.g. computer PR-2), followed by makeready data messages for one or more presses and a collator, all related by a common job number. This number can be any appropriate alpha and/or numeric sequence used for job identification. Content of a typical press makeready and collator makeready message is as follows.

| Press Makeready Data Message | |
|---|---|
| Job Number (can be alpha/numeric) | |
| Part Number | |
| Material descript. (type, weight, no.) | |
| Infeed tension (control LH punch spacing) | |
| First offset | around |
| Second offset | around |
| Third offset (as needed) | around |
| Imprint (first numbering) | around |
| Second numbering | around |
| File punch | around |
| Internal cross perf | around |
| Web guide | across |
| Grippers stream 1 | across |
| Grippers stream 2 | across |
| Grippers stream 3 | across |
| Imprint stream 1 | across |
| Imprint stream 2 | across |
| Imprint stream 3 | across |
| Second numbering stream 1 | across |
| Second numbering stream 2 | across |
| Second numbering stream 3 | across |
| File punch stream 1 | across |
| File punch stream 2 | across |
| File punch stream 3 | across |
| Line hole punch stream 1 | across |
| Line hole punch stream 2 | across |
| Line hole punch stream 3 | across |
| Skip perf stream 1 | across |
| Skip perf stream 2 | across |
| Skip perf stream 3 | across |
| Vertical perf gear side stream 1 | across |
| Vertical perf gear side stream 2 | across |
| Vertical perf gear side stream 3 | across |
| Vertical perf op. side stream 1 | across |
| Vertical perf op. side stream 2 | across |
| Vertical perf op. side stream 3 | across |
| Vertical slitter (gear side) | across |
| Vertical slitter internal #1 | across |
| Vertical slitter internal #2 | across |
| Vertical slitter (operator side) | across |
| Fold length | |
| Fold width | |
| Fold phase | |

| Collator Makeready Data Message | |
|---|---|
| Glue Nozzle #1 (etc.) | on/parked |
| Glue valve #1 (etc.) | on/off |
| Crimp wheels | on/parked |
| Crimp wheels | around |
| Impact wheels | on/parked |
| Impact wheels | around |
| Crash numbering | around |
| File punch | around |
| Cross-perf/cut-off | around |
| Roll #1 | across |
| Roll #2 | across |
| etc. | |

-continued

| Collator Makeready Data Message | |
|---|---|
| Grippers | across |
| Pin band | across |
| Glue nozzle #1 | across |
| Glue nozzle #2 | across |
| etc. | |
| Crimp wheel gear side | across |
| Crimp wheel op. side | across |
| Impact wheels gear side | across |
| Impact wheels op. side | across |
| Numbering | across |
| File punch gear side | across |
| File punch op. side | across |
| Vertical perf gear side | across |
| Vertical perf op. side | across |
| Slitter gear side | across |
| Slitter op. side | across |
| Folder chute phase | |
| Folder length | |
| Folder width | |

Details of a system for the transmission and handling of such messages are disclosed in a U.S. Pat. application of Harris Corporation, Ser. No. 359,967, filed Mar. 19 1982 in the name of Alan J. Carney, entitled Data Communications System Ensuring Redundant Message Suppression, now abandoned.

FORMS PRESS ORGANIZATION

The forms press comprises a base supporting, in longitudinal alignment a number of stations at which various operations are formed on a web of paper or like material in order to print, mark, punch, and perforate the web repeatedly. Such machines are per se well known, and details of them are shown, for example, in U.S. Pat. Nos. 3,249,316; 3,250,528; 3,369,436; 3,398,618; 3,592,133; 3,883,131; and 3,938,437. The drive system (FIG. 10), including the line shaft 10, gear boxes 11, etc., is shown schematically, it being understood that such drive is mechanically conventional and is arranged in order to operate the rotating and other moving parts at the various stations of the machine in exact synchronism, such that operations performed at any station are in register with operations performed at other stations.

The unwind station 12 includes a support for the roll 14 from which the web is pulled. Exiting the unwind station the web passes over an adjustable web guide device 15, which establishes the lateral position of the web. A typical device of this kind is available from General Web Dynamics, Rockford, Ill., and U.S. Pat. No. 3,390,823 shows details of such a device After the unwind station 12, understanding that the web 20 is unwound and progresses from left to right as viewed in FIG. 10, the web enters the infeed station 17 wherein a variable speed draw roller is used to control the tension/punch length adjustment in the web. There are first and second print stations 22 and 23 which include conventional printing cylinders, etc., for printing repetitively on the web by means of offset, letterpress, flexographic, or gravure printing, as may be desired. It is understood that there may be one or more stations, which can print in different colors as well as different images. In the embodiment shown, offset printing equipment is generally illustrated since it is most often used, and two print stations are shown with turning bars 25 therebetween. The web can optionally be threaded around the turn bars in order to reverse the surface of the web presented to the second print station 23, such an arrangement sometimes being referred to as backprinting.

Following the second print station, there is a first numbering station which is optionally used for performing an operation known in the business forms printing art as "imprinting". In general, a repetitive printing operation is performed on the web at station 30 by one or more flexible letterpress-type plates, sometimes referred to as "patches", which are secured to the surface of a narrow supporting cylinder 32 in predetermined registered locations. The printing operation is generally similar to letterpress printing, with ink appropriately being applied to the raised image areas of the imprint patches, and the cylinder being rotated by a shaft 33 driven from the line shaft. The cylinder is movable along shaft 33 as later set forth.

Following the imprint station, the web passes to a second numbering station 35; where one or more conventional numbering machines are mounted to print different number combinations on the web. The numbering machines function, as is generally known, to change the number printed on successive portions of the web, either in straight numerical progression, reverse progression, or in some progression where certain numbers are skipped, depending upon the size and complexity of the particular job, and the number of these machines being used. The numbering and imprint units can be rotated in reverse direction and the web path altered to enable numbering and/or imprinting on the back of the web.

After numbering, the web passes to the processing section of the press, first to a so-called file punch station 40, where one or more rotary punch and die mechanisms 42 may operate on the web to form so called file holes FH in areas of the web. These holes are sometimes provided in business forms as a convenience to the user, being intended to receive posts, brads, or other retainers to hold the separated sheet or form in a file. The holes may be located at any convenient point within the area of the form, depending upon the needs of the customer and his filing equipment.

After the file punch station, the web is threaded through a line hole punch station 44, wherein appropriate rotary punches and dies can form line holes LH, usually in marginal regions of the forms. These holes are needed particularly in multipart forms made up of several webs, wherein webs prepared in this or similar machines are subsequently combined with similar webs in a collating machine, as described hereafter.

Following the line hole station 44 there is a perforating station 45, which may incorporate several different types of perforators and/or slitter devices for forming partial lines of severance either crosswise or lengthwise of the web, as needed. Some of these lines (CP, VP, SP and PP) are indicated in the typical form. The first part of the perforating station usually incorporates a cylinder containing the first or main cross perforator blades which form the lines CP that also separate successive forms. This is followed by small slitter wheels arranged to contact the web intermittently, these usually being known as skip perforators, then followed by a second cross perforator cylinder which may be used to make internal or partial cross perforations, and subsequently followed by one or more vertical perforators which perform lengthwise discontinuous slits or cuts in the webs, and then followed by slitter wheels which make continuous lengthwise slits in the web to divide it into streams.

At this station operations on the web are essentially complete except for determining the form in which the web is taken from the machine. If the finished web is part of a multipart form, then it will be rewound onto a take-up roll 48, and can be carried away on any convenient device to the collating machine, where the web is unrolled from the roll 48. On the other hand, if the particular job is concerned with a single layer form, or with some other printed product such as consecutively numbered tickets, cards, or the like, the web may optionally be supplied to a zig-zag folder which comprises the folding cylinders 50 and delivery table 52. Details of typical folders are disclosed in U.S. Pat. Nos. 3,250,528 and 3,912,252. It is also possible to sever the web into individual sheets at this station, as is well known in the art.

From the foregoing it will be appreciated that a number of the operations at the different stations broadly described are optional, depending on the particular need of the job, thus the press may be used in many different combinations, with some stations operative, and others not functioning, depending upon the types of printing required (if any) and the types and locations of punched holes and various perforations and slits in the particular job requirement. A typical press is capable of multicolor printing, printing on both sides of the web, printing numbers in desired progression on each image area of the web, along with the necessary punched holes and/or perforations, all in registration with the web operating at speeds up to the order of 1200 feet per minute.

PRESS MAKEREADY CONTROL

Figure 10:
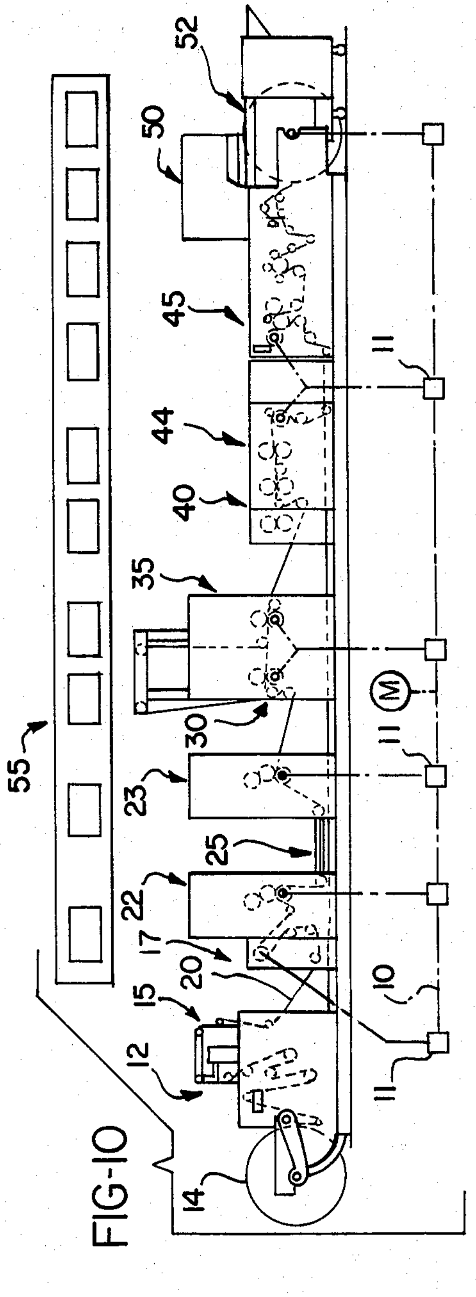
FIG. 10 is an overall view of a typical web press for printing business forms.

In FIG. 10 above the outline of the press, enlarged and shown schematically, are the digital displays 55 which are used to indicate the circumferential and lateral locations of various adjustable mechanisms of the press, with respect to a common zero position which is established for all these mechanisms in the various press sections. FIG. 16 shows the arrangement of the console control panel for a press, and, as will be explained later, some of the displays on this console duplicate the information in the displays 55 shown in FIG. 10. The ultimate purpose of these displays is to inform the press operator, both during makeready and during running of good impressions, of the currently set status of all the different mechanisms. During makeready of the press, in accordance with the invention many of these settings are accomplished automatically under microprocessor control, thus the operator has only to observe the information from the digital readouts and check it for accuracy against his job instructions. However, the operator can override the automatic setting, either for corrective purposes or in the case of some contol failure, and for this purpose the operator is provided with various control switches and devices at the several stations, and at the main control console for the press, all described hereafter.

Figure 14:
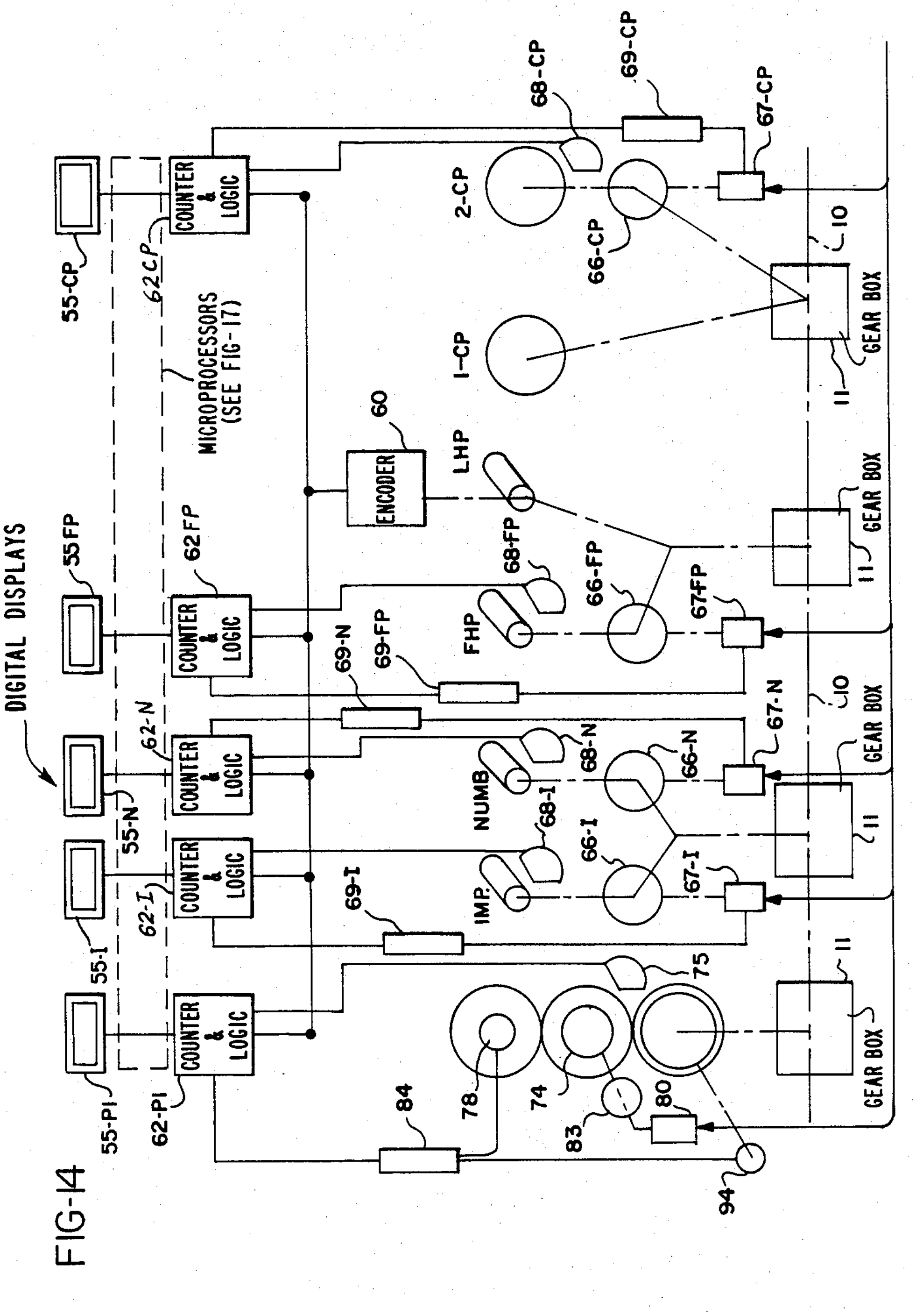
FIG. 14 is a schematic diagram of the circumferential adjustment controls and readouts for a press.

As shown in FIGS. 10 and 14 the main drive motor M rotates the line shaft 10, which is connected through various gear boxes 11 to the different sections of the press. In the file punch station 40, and in the processing section, there are direct connections between the first cross perforating cylinder and the drive train, and between the line hole punch and die shafts and the drive train. This establishes the zero rotational or circumferential position of the entire press, and circumferential adjustments are made using these as a reference or zero position, although other means can be used for this purpose.

Figure 15:
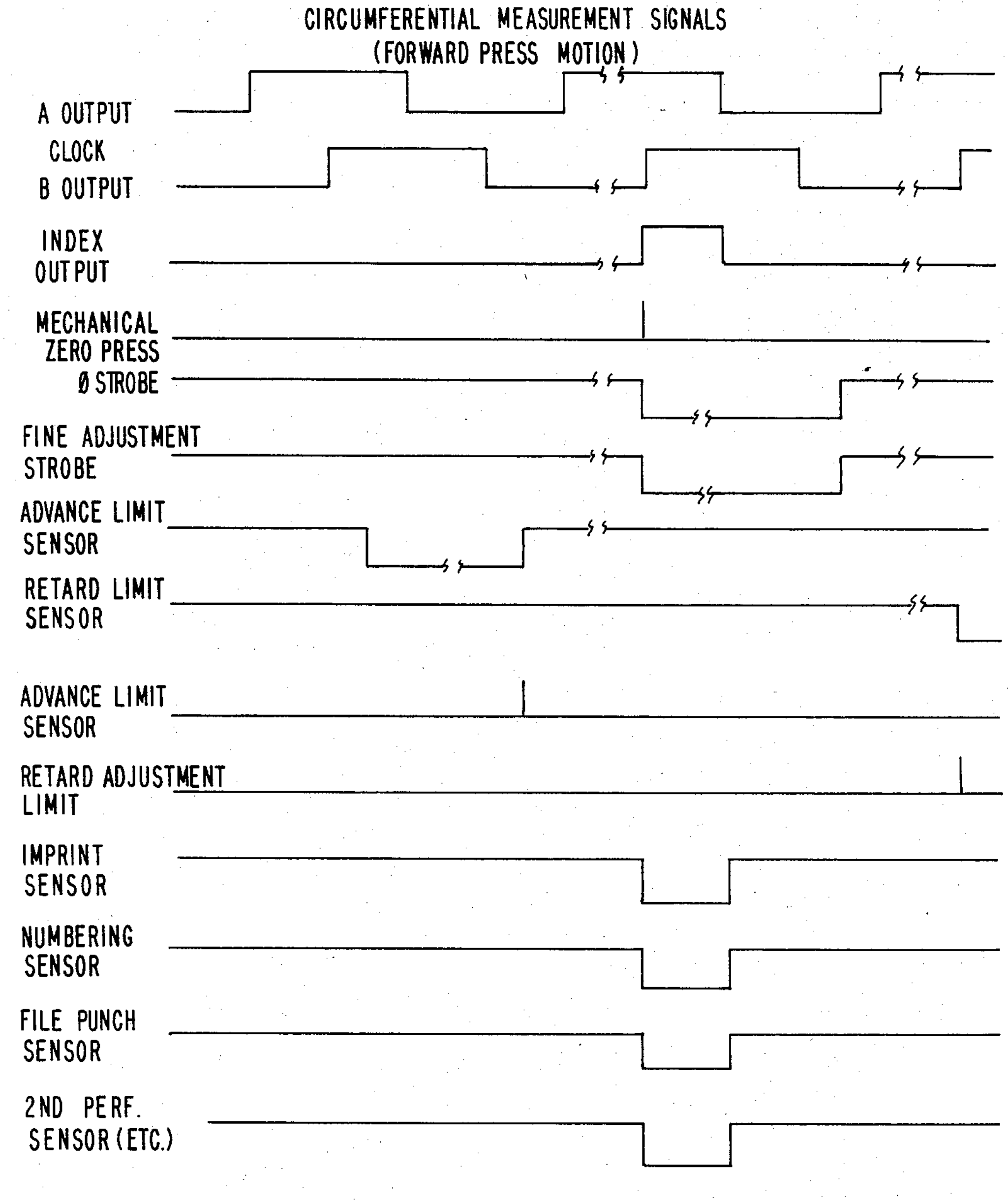
FIG. 15 is a timing diagram for some of the press controls.

An optical incremental encoder 60, with a marker pulse channel, is driven from the shaft carrying the die of the line hole punch and functions as a pulse generator which provides clock output and reference trigger pulses for the system. The general arrangement of the static and dynamic electronic phase measurement system is shown in FIG. 14, in block diagram form, and the pulses are represented in FIG. 15. The output of the encoder 60 driven by the line hole die shaft is directed to an up-down counter 62-FP and its associated logic circuit, and the counter in turn is sampled by a microprocessor (not shown) which drives a digital display 55-FP, which in this case is intended to show the circumferential location of the file punch and die. It will be appreciated from FIG. 3, which shows the sample form, that the file punch holes FP may be located at varying distances from the cross perforation CP, which, for purposes of this explanation, will be considered as having been made by the first or primary cross perforation station, and therefore located at the circumferential zero position.

The drive for the file punch and die shafts is derived, mechanically, from the gear box 11 at the processing station, and is coupled through a high ratio differential 66-FP, preferably of the harmonic drive type, which has a secondary input from a stepping motor to achieve very small differences in phase adjustment between the primary input (from the gear box) and the output of the differential. As shown, the differential output in turn drives the file punch shaft, and a once per revolution sensor 68-FP, for example a Hall effect switch, is actuated from the file punch shaft and thus gives a single output pulse for each revolution thereof. If the file punch is located at the zero position, the pulse from this sensor corresponds to the marker pulse from the master encoder.

For each revolution of the press drive, the counter 62-FP is reset by the reference trigger pulse, and clock pulses are counted until an output from the sensor 68-FP stops the count. The display 55-FP shows the number stored in counter 62-FP as a digital value, which is refreshed each revolution as the press is running. Thus, in the dynamic mode the number displayed represents the actual adjusted circumferential position of the file punch and die with respect to zero or reference position.

If the press is stopped, adjusting pulses to the stepper motor 67-FP will drive the pulse counter 69-FP up or down, and it in turn will increment or decrement the counter 62-FP so the display will be updated to the anticipated new location of the file punch and die.

The same arrangements apply to the numbering/imprint section, thus the same numerals with suffix I and suffix N are applied to like parts. The second cross perforating cylinder may likewise be circumferentially displacable, for example to locate a partial or intermediate cross-perforation (PD in FIG. 3), so the same numerals with suffix CP are applied to corresponding parts in its control and display.

Figure 11:
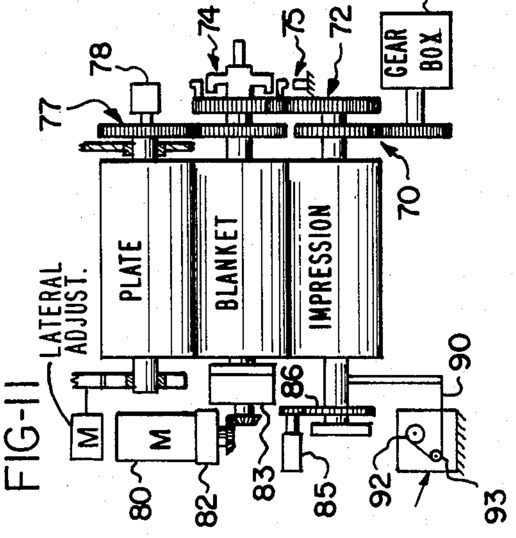
FIG. 11 is a diagrammatic view of one printing section with its circumferential and lateral adjustement devices.

The circumferential controls and displays for the print sections are shown with reference to FIGS. 10, 11 and 14. The print sections are shown diagrammatically as lithographic offset units, from which the inking and dampening mechanisms, and the impression on-off controls, are omitted for clarity. The impression, blanket, and plate cylinders are marked with corresponding legends in FIG. 11. The impression cylinder is driven directly from a gearbox 11 by a set of helical gears 70, and the shaft of the cylinder is mounted, with its bearings, for limited movement along the cylinder axis in conventional fashion.

The impression cylinder shaft in turn carries one gear 72*a* of a helical gear set 72, the other gear 72*b* of the set being rotatably mounted on the blanket cylinder shaft, and selectively coupled to it by a clutch 74. The gear 72*b* cooperates with the Hall effect switch 75 to produce a pulse once per revolution, as in the case of the units 68. The blanket and plate cylinder shafts are counter-rotated by the gear set 77, and the plate cylinder is also journaled in bearings which are conventionally mounted for limited movement along the plate cylinder axis. All of the foregoing gears are typically located on the so-called gear side of the press, as is a two channel and reference rotary encoder 78 which is coupled to the plate cylinder shaft. This encoder provides a reference pulse once per revolution, plus time-displaced pulses at the same frequency from its two channels, thereby providing an indication of rotation by comparison. In a typical arrangement, the space between two pulses is equal to 0.010 inch.

A stepping motor 80 is connected via a gear reduction unit 82 and an electric clutch 83 to the blanket cylinder shaft at the operator side of the press. With clutch 74 open, clutch 83 engaged, and the unit off impression, the stepping motor can change the phase or circumferential adjustment of the plate/blanket cylinder with respect to the drive, through a full 360 degrees, thus providing a means for static circumferential setting or displacement. When this happens, there is no output from the switch 75, and pulses from the encoder 78 are transmitted to the pulse counter 84 and thence to the display counter 62-P1. This causes the current circumferential position to be displayed. The number on the display represents the circumferential displacement of the center of the plate cylinder gap from a location where the output of switch 75 is aligned (in phase) with the reference index pulse from the master encoder 60. The number also can be used as a feedback or position detection.

There is in addition a provision of a means for adjustment while the press is running, also known as a trim adjustment. A gear head motor 85 is connected through reduction gears 86 to the impression cylinder shaft. This motor can be energized to move the impression cylinder in an axial direction. The axial movement at the helical gear set 70 causes a corresponding circumferential displacement between these two gears.

A means to read this trim adjustment, and also to provide feedback to the adjusting motor control, is provided by a tape 90, preferably a toothed belt, which is drawn from a spring-loaded reel 92 and passes around a toothed pulley 93 (FIG. 11) connected to the shaft of a two channel encoder 94, then is fastened suitably to the movable bearing carrier of the impression cylinder. This encoder is connected to increment or decrement a pulse counter 84, which in turn drives the display counter 55-P1 as shown in FIG. 14. This arrangement provides an immediate reponse to lateral motion of the impression cylinder, which motion is directly related to circumferential displacement by the helix angle of gear set 70.

Figure 8:
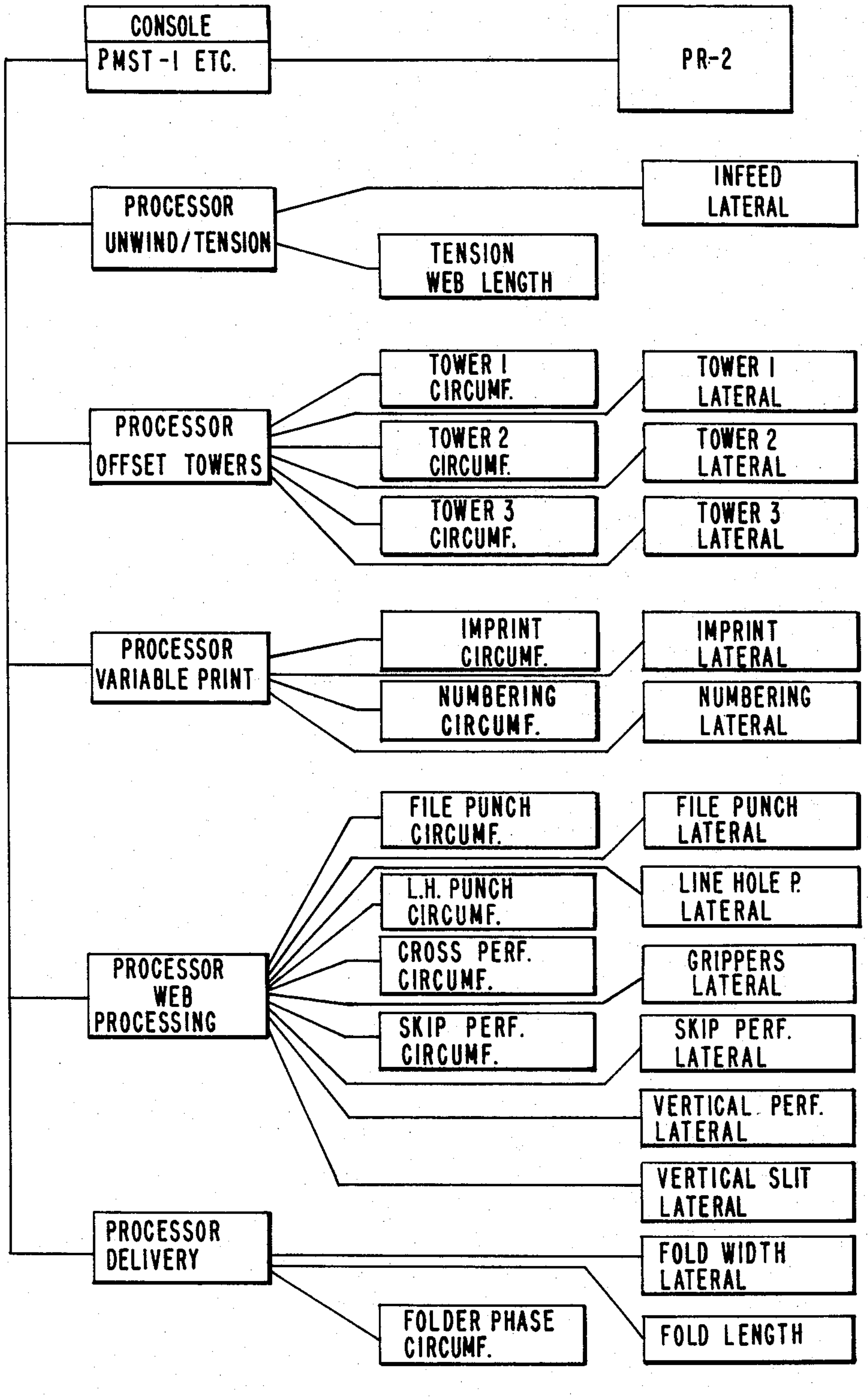
FIG. 8 and 9 are block diagrams showing greater detail of the parts of the system for control of a press, and a collator, respectively.
Figure 9:
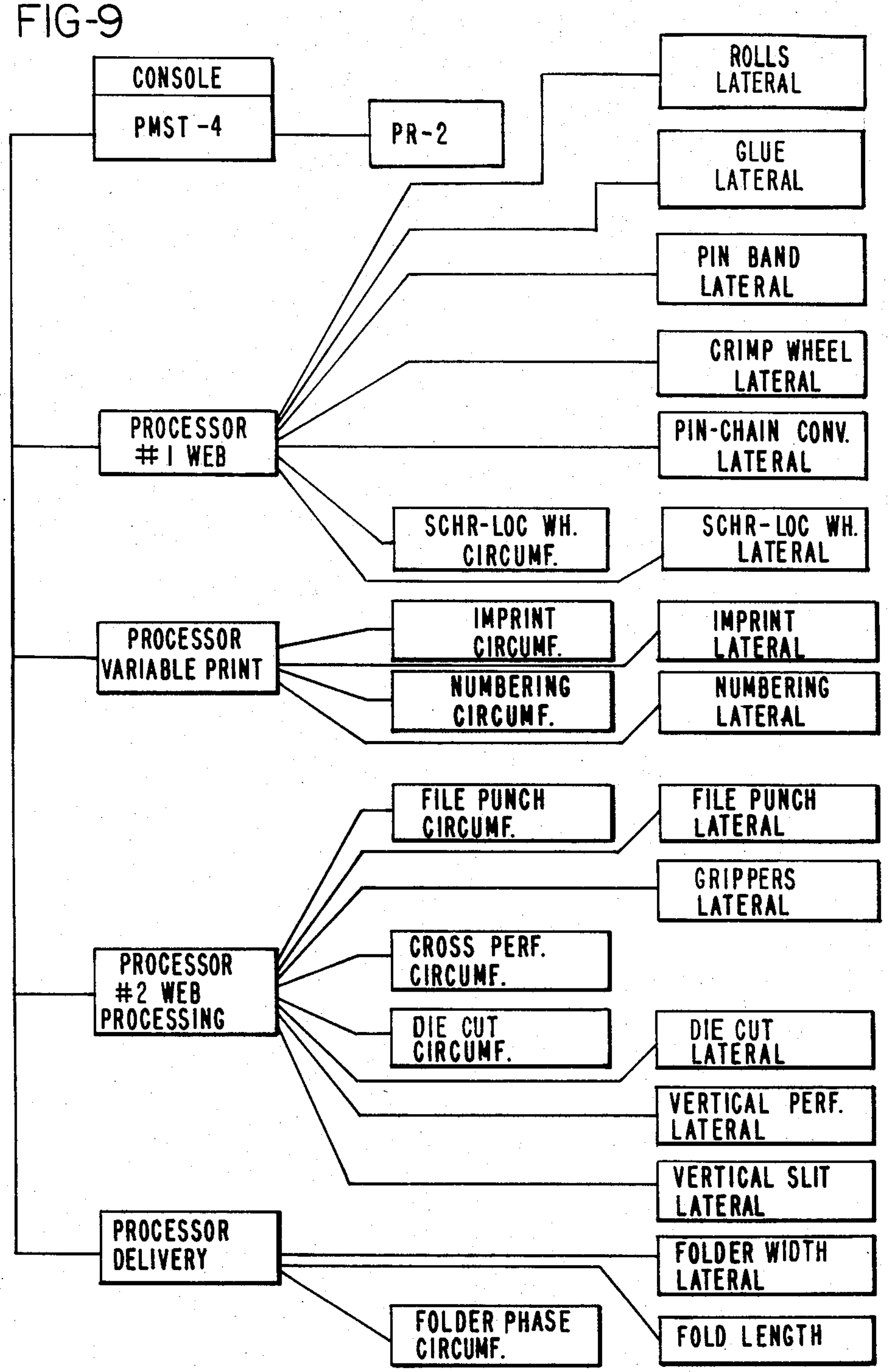

The diagram in FIG. 8 illustrates the relationship of the system to one of the presses wherein the main processor PR-2 is shown in communication with a microprocessor at one of the press operator consoles PMST-1. In one system constructed as described herein, this connection is directly wired from a port of the computer, although other arrangements are possible. An integrated data base is provided in a section of memory and processing devoted to the building and maintaining of active job files, while other memory sections can be utilized to store management and maintenance information derived from the system, and also to store inactive job descriptions. The console processor communicates through a bus interface circuit to a data bus which is linked to several microprocessors MP-5 at various sections of the press (or collator as in FIG. 9) which cooperate to handle setting of the apparatus during the makeready portion of a job. As shown, there is a processor which controls the setting of the web guide mechanism 15 in the unwind section and, during press operation, controls web tension and line hole spacing, which is a critical part of forms manufacturing as later explained. A second processor controls the setting of circumferential and lateral register in the offset printing towers of the press, through controls and feedback devices which are later described in detail.

Another processor controls the setting of the parts of the press having to do with variable print information, usually the imprint section and the numbering section of the press. A further microprocessor controls the setting of the various devices incorporated in the web processing section of the press, these being the file punch, line hole punch, cross-perforation, skip-perforation and vertical-perforation units, and the vertical slitter. A further processor controls the delivery section of the press, which may be alternatively of different types, depending upon the job, as previously explained. In FIG. 8, this processor is shown as functioning to control the lateral position of the screws or helixes in a folder, and this could be either a continuous or batch folder, as can be seen from the disclosures of the aforementioned U.S. patents.

Figure 17:
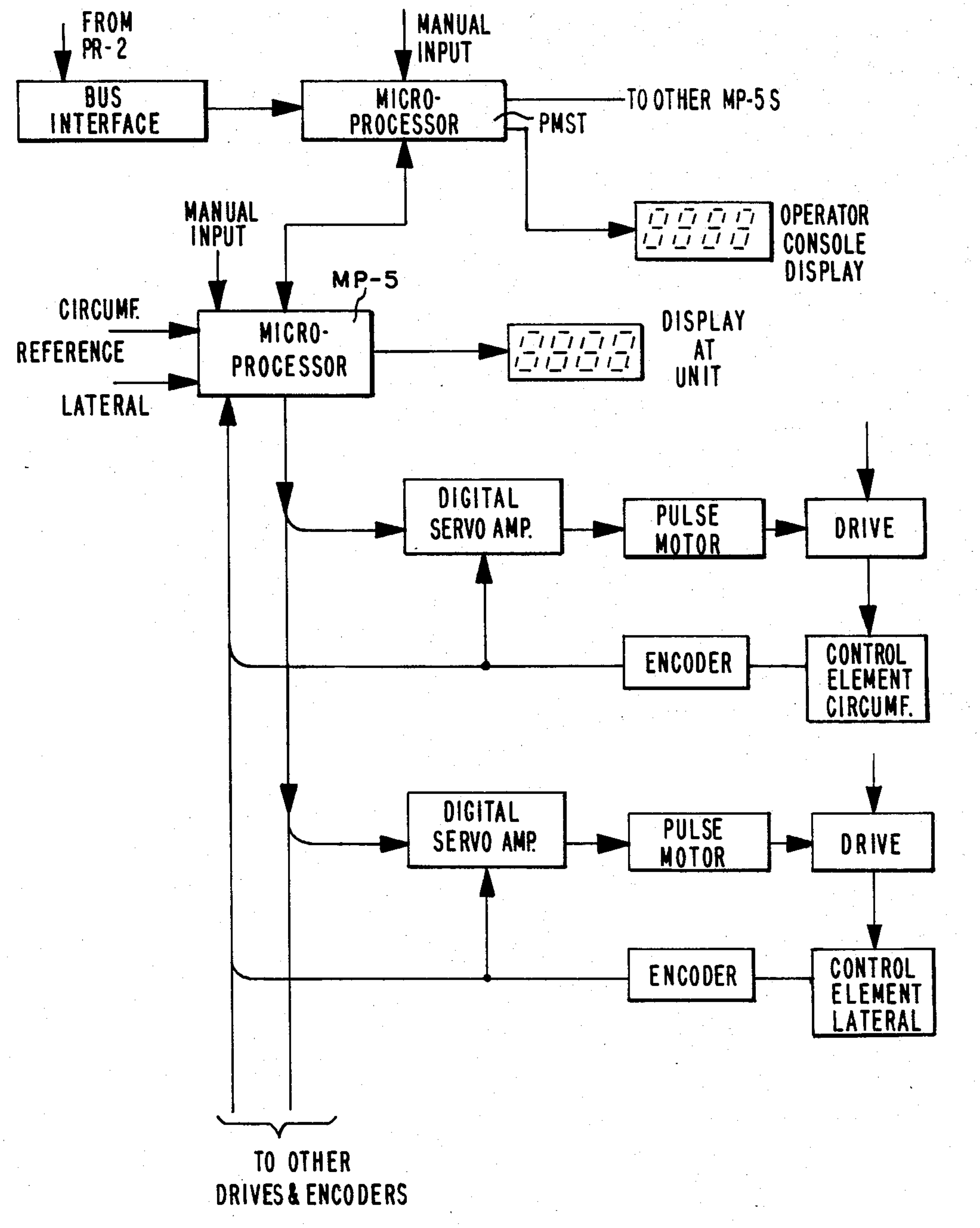
FIG. 17 is a block diagram illustrating the interfacing of the microprocessor controller with two adjustment motors on a press or collator.

FIG. 17 is a diagram showing details of a typical unit processor, the one illustrated being for the file punch unit, but being typical for all these devices at the various sections of the press or collator. Data in digital form is transmitted as messages through the bus interface circuit and the main bus to the console microprocessor PMST which retains and also distributes this information and which includes an input through which the operator can add, delete, or change information manually, as necessary. This microprocessor PMST in turn communicates with further active control microprocessors MP-5 which have additional manual inputs, and may have reference inputs identifying both circumferential and lateral position of the particular unit or units being controlled. Dual displays are provided, one near the corresponding unit (see FIG. 10) and one at the console (FIG. 16) to show the operator actual position of the press unit involved.

The digital information, for example identifying the circumferential setting of a unit with respect to a given reference, is output from the processor MP-5 to a digital servo-amplifier circuit which controls a pulse motor or the like connected to move a drive unit on the press. As shown schematically, this unit is also provided with manual adjustment input as may be necessary. The drive unit in turn controls the position of an element in the press, for example the circumferential and lateral displacement of the line hole punch and die, with respect to a zero or reference setting, and this element has attached to it an encoder (FIGS. 12 and 13) which provides digital information as to the adjusted position of the control element, this information being used as feedback to the digital servo-amplifier and to the microprocessor. In FIG. 17 a typical arrangment is shown for both circumferential and lateral positioning, operated on a time share basis by processor MP-5. It will be understood only one or the other may be needed at a particular unit.

In addition, this control may utilize interactive elements to provide ongoing feedback to the microprocessor MP-5 from sources other than the encoder on the unit indicating the possibility of need for further adjustments. For example, an optical detector can be arranged to focus upon reference marks which may be printed on the web by a particular plate in one of the offset towers, or the mark may be located in an unobtrusive portion of the plate itself. The detector observes the location of the mark in dynamic fashion during press operation, and provides an output to an analyzer circuit which in turn feeds back information to the microprocessor MP5, calling for additional adjustment of the drive and control elements as might be necessary.

The lines extending from the output of microprocessor MP-5 and from the feedback lines thereto indicate extension to like controls in other parts of the machine unit. For example, in the portion shown in FIG. 17 and described above, the processor PMST and may function on a time sharing basis with MP-5s to control circumferential and lateral register in each of the three offset printing towers of the press.

PRESS CONSOLE

FIG. 16 shows the control and display console of one of the console units PMST-I, II, III, without the associated terminal T which appears in FIG. 6. The lower left section of the console incorporates the Production Monitor System (PMS) controls and display, this system having previously been identified. This includes a single line visual display in which the term "press management display" appears by way of explanation. Beneath this display there is an alpha/numeric entry keyboard, a row of control buttons, and an area in which operations code lists can be supported for convenience of the operator. When the operator enters a job number at the PMST keyboard, this initiates transmitting of the makeready data from PR-2 to the PMST microprocessor.

The lower right area of the console includes a total impressions counter and a switch, directly to the right of the counter, which the operator can turn on and off to initiate the count. To the right of this counter are rotatable control handles for speed controls which are used to regulate the speed of power driven dampener rolls on the dampeners of the offset printing towers. Only two are shown active since the presses as illustrated have only two printing towers, but the console includes capacity for up to four. Beneath the impressions counter is a display and controls for web tension, and beneath that is a control knob to regulate press speed along with a digital display of the running speed of the press usually expressed in feet per minute. To the right of the speed controls there is a two position rotary switch which is shown in the off position, and is used to bring each printing tower "on impression", in other words into contact with the web.

To the right of that control are two push button switches, the lower being a momentary contact switch by means of which the press drive can be jogged or inched, and the upper switch button being connected to a suitable control which holds the press in running condition. Beneath the press speed display there is a control switch for engaging and disengaging the web break detectors, to the right there is a control for changing the nominal web position, and in the lower right corner there is a stop switch control for the drive which will disengage the drive upon momentary actuation.

Referring to the upper left corner of the console, there are two switches, the uppermost of which when contacted will set the press into an initializing position, which may be different from the zero position. For example, when this control is actuated all plate cylinders may be rotated such that the gap is upward for convenience of the operators in removing or hanging plates, and similar positions may be predetermined for the other sections of the press to make it most convenient for the operator to add and/or remove various items such as imprint patches, numbering machines, punches and dies, slitters, etc.

The lower of the two buttons, when contacted, cause the makeready information previously stored in the microprocessor PMST to be sent to microprocessors MP-5, which in turn cause the mechanism controlled by them to move to the makeready position.

The section of the console to the right of these switches includes a display, for example of the seven segment four digit type, which is utilized to display the circumferential displacement of each of the platecylinders in the offset towers. The control buttons directly below the display select whether readings are to be given for unit one or unit two, the switch to the left of those control buttons is a rocker type switch of the kind which normally in a centered-off position, and when depressed in one direction moves the appropriate adjusting motor at fast or slow speed. A similar rocker switch is to the right in this section and selects forward or reverse direction of the adjustment drive. To the left of the display there are control switch buttons which select whether the adjustment is a 360° adjustment, accomplished with the stepping motor 80 (FIG. 11) and the clutch 74 disengaged, this switch being indicated by a circle, or whether the adjustment is a trim circumferential adjustment which can be accomplished dynamically energizing the gear head motor 85. Provision may also be made for controlling and displaying lateral displacement in the printing towers. This is usually a trim adjustment made by an operator in response to visual observation of mis-register or the like.

At the upper center of the console there is a further digital display with a symbol to the right representing a numbering machine. This display is available to show circumferential and lateral positions of the patch in the imprint and of the numbering machines at the first and second numbering stations.

The four selector buttons in the center represent the functions that can be controlled from this position. The two switches under the numeral 1 provide circumferential (upper) and across (lower) adjustments at the imprint station, and the two buttons under the numeral 2 provide like functions at the numbering station. The rocker switch to the left provides fast and slow control, while the rocker switch to the right provides forward and reverse adjustment in the circumferential direction, or transverse adjustment toward either the gear side or the operator side of the press.

Finally, the upper right section of the console provides a display for showing circumferential or transverse adjustments in the processing section. Again, there is a rocker switch for fast and slow speeds and one for forward and reverse or gear-operator side movement. The eight control buttons beneath the display provide (left to right), control over circumferential and transverse movement of the file hole punch, and circumferential only adjustment of the compensator which (as is known) adjusts the length of web between the line hole punch and the first cross perforating cylinder in order to provide a relative adjustment between the placement of the cross perforation CP and the line holes LH. The next set of control buttons provides for circumferential adjustment only of the second or internal cross perforator cylinder (where used), and the next three buttons control lateral adjustment of the vertical perforator wheels, slitters, and the gripper rolls in the processing section. The final set of buttons provides for circumferential and transverse adjustment of the elements of the folder, in order to assure that the fold occurs along the cross perforation if the web is to be folded.

COLLATOR ORGANIZATION

Figure 22:
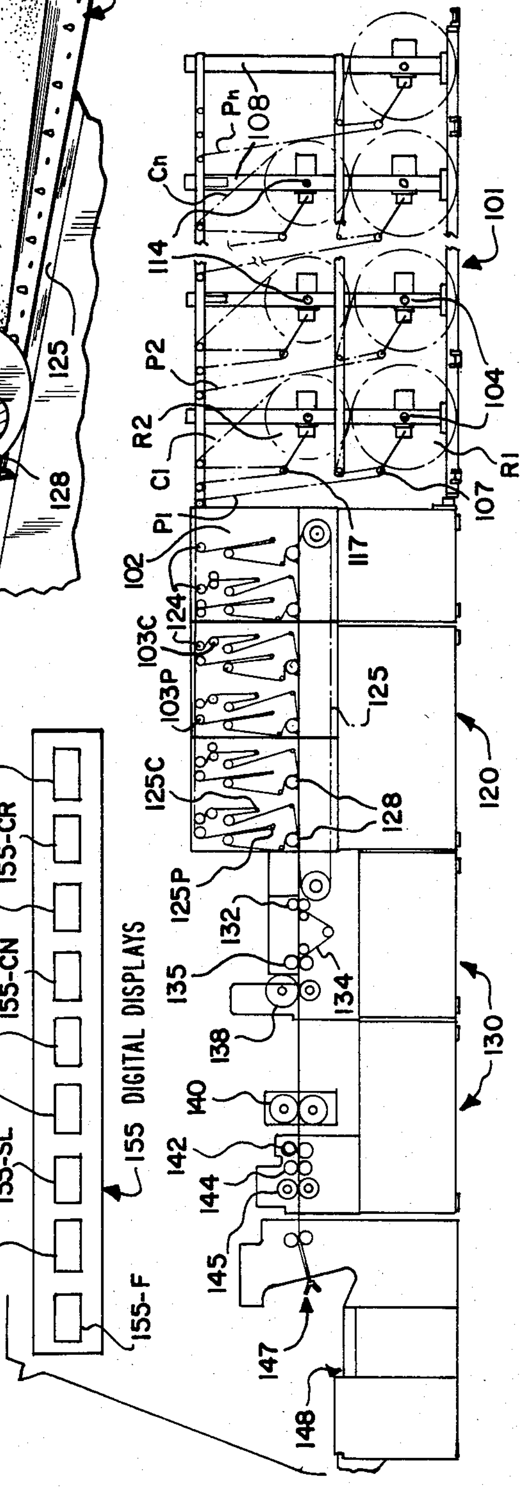
FIG. 22 is an overall side view of a typical collator for multi-part forms.

The collating apparatus shown in FIG. 22 includes an elongated base and a vertical frame or wall 102 on the gear side. In the supply section 101 of the apparatus, a series of horizontally arranged parallel spindles 104 are supported in cantilever fashion from the individual posts 108 for free rotation, and can receive corresponding rolls R1 of form webs P1, P2, etc. each having the longitudinally spaced marginal perforations or feed holes LH. Each roll R1 is rotated and unwound by a power driven roller 103, acting through an adjustable speed drive from a line shaft 105 and gear boxes 106 (FIG. 24) transferring power to the sections of the collator.

Each web P1, P2, etc. is directed from its roll R1 around a fixed idler and then around a pivoted weighted dancing idler 107. Brakes are mounted to act upon each of the spindles 104, and each brake includes an actuator rod which is regulated by control signal from a dancing idler. When the tension in one of the webs P begins to drop below a predetermined value set by the weight, the dancer idler 107 causes the corresponding brake to apply pressure against its spindle 104, so each paper web is fed at a constant rate from its corresponding roll depending on the demand from the machine.

Figure 23:
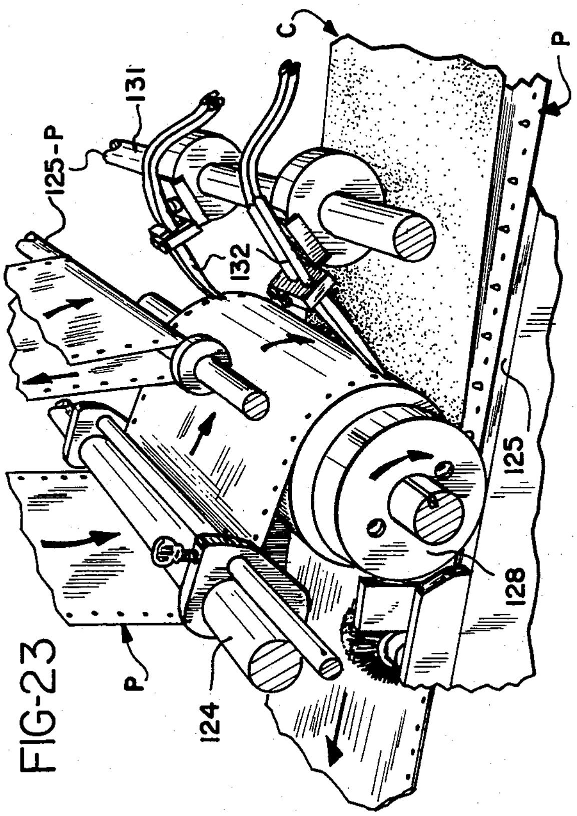
FIG. 23 is a detail view of a section of the collator.

A second series of freely rotatable spindles 114 are supported by posts 108 directed above the spindles 104 and holding rolls R2 of carbon webs C1, C2, etc. which are usually narrower in width than the paper webs P1, P2, ... so the edges of the carbon webs will be spaced inwardly of the holes LH within the paper webs as shown in FIG. 23. Each of the rolls R2 is unwound in a manner similar to the rolls R1, that is, each carbon web C1, C2 ... is directed from its roll R2 around a corresponding dancing idler roller 117 which is supported in the same manner as each of the dancing idlers 107 and is effective to control a corresponding brake in the same manner as described above. Each of the spindles 104 and 114 may optionally include an outer tubular member supported for lateral movement along an inner cantilever mounted shaft. A lead screw driven by a stepping motor can be used to move the outer member, and a roll carried thereon against a stop collar, in a lateral direction to adjust the roll position. Automatic core locking chucks can be incorporated in the outer member. This arrangement is substantially conventional and is not illustrated.

Figure 13:
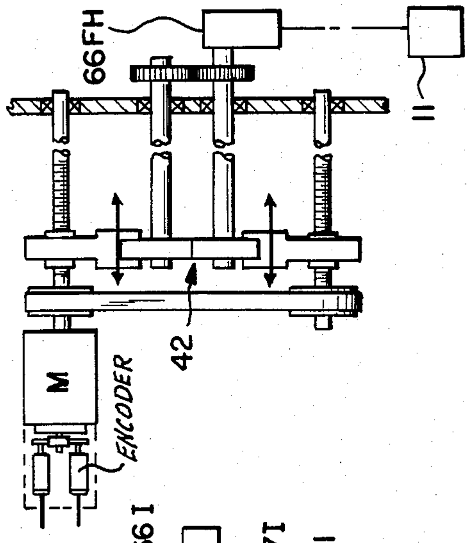
FIG. 13 is a schematic view of adjustors and encoders in a dual element station such as the file punch in the processing section.
Figure 24:
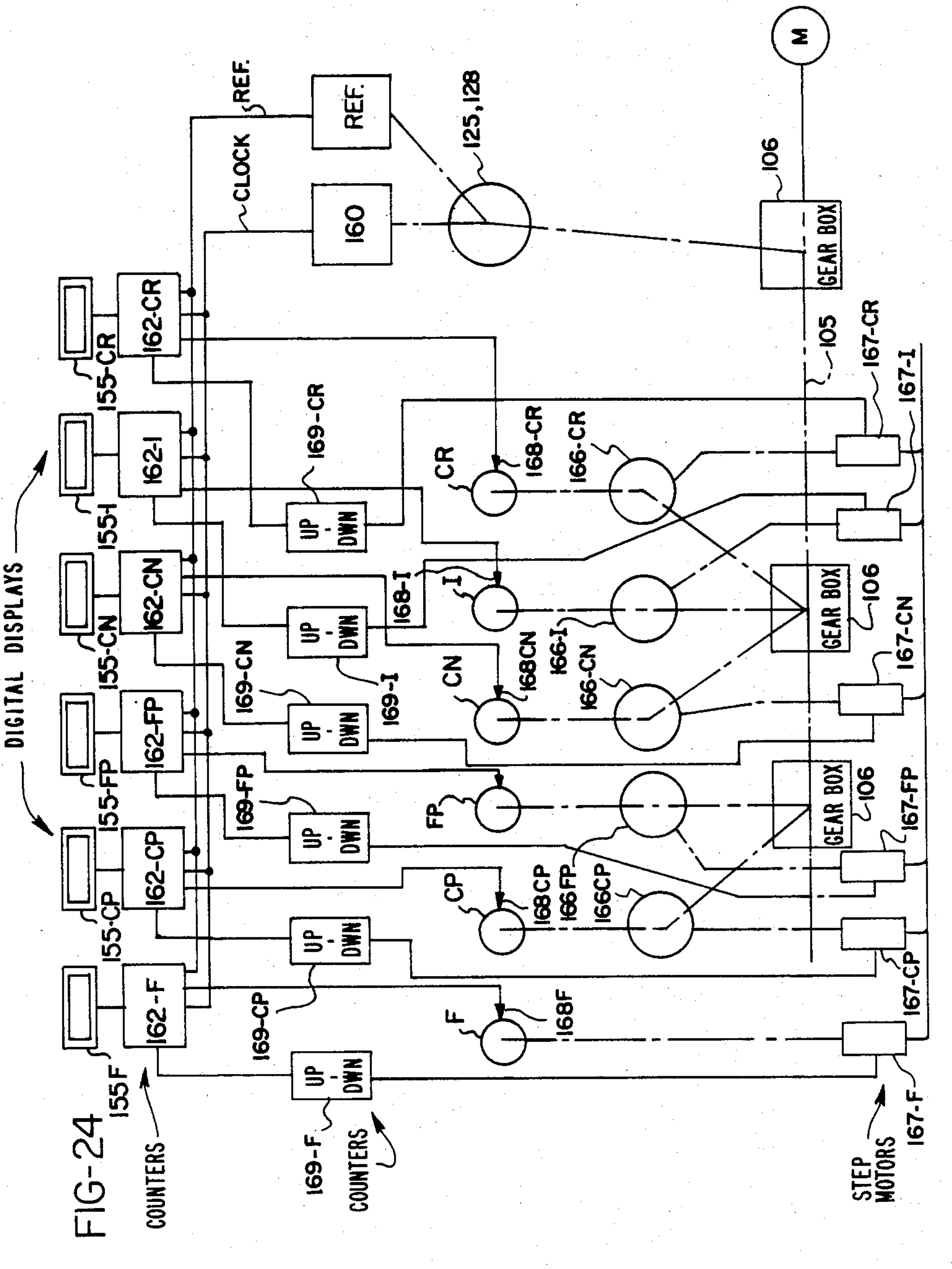
FIG. 24 is a schematic diagram of the circumferential adjustment controls and readouts for a collator.

Each of the paper webs P1, P2 ... is directed upwardly from the corresponding dancing idler 107 around a fixed idler roller 118 and then to the collating and glueing section 120. Each carbon web C1, C2 ... is directed upwardly from its dancing idler 117 around roller 122 to join the corresponding paper webs P1, P2 ... in the collating section. The paper and carbon webs are drawn over other supporting rollers, thence to their pulling rollers 103P or 103C, around light weight dancing rods 125-P or 125-C, thence around tension controlling snubber bars 124 to the spaced apart pin bands 125 which carry the joined webs to the processing section 130. Each paper web is guided onto the pin bands by power driven drive wheels 128. The pin bands and drive wheels are laterally adjustable in the same manner as shown in FIG. 13 except they are driven directly from a gear box 106 and the line shaft 105 as shown in FIG. 24.

Figure 12:
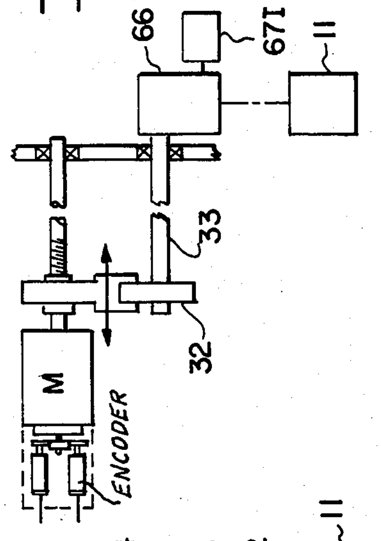
FIG. 12 is a diagrammatic showing of parts of typical circumferential and lateral adjustment devices and encoders for a single element station.

Glue applicators 130 are positioned adjacent each of the drive wheels 128, except for the end wheels which guide the bottom web of the set, and each applicator includes a discharge nozzle which can deposit a fine continous line of glue to the corresponding paper web P. The glue applicators are each laterally adjustable by devices such as shown in FIG. 12, and the shaft 131 on which they are carried is rotatable between a parked or retracted position and an on position as shown in FIG. 23. Diverter valves (not shown) are incorporated in each applicator to by-pass glue back to a reservoir when that applicator is not in service.

Thus, instead of glueing the marginal edge portions of each set of paper and carbon webs with the glue applicators, they can be retracted and the edge portions of the webs may optionally be attached by longitudinally spaced and longitudinally extending crimps produced by the cooperation of circumferentially spaced projecting prongs on a crimping wheel set 132. These wheels are also laterally and circumferentially adjustable by mechanism such as shown in FIG. 12. From the crimping mechanism, a short length pin band conveyor 134 moves the webs to sets of intermittent toothed rotary impacting devices 135 of the type shown in U.S. Pat. No. 3,727,908. These devices are used with glued forms and are disengaged when the crimping wheels 132 are used, and are also laterally and circumferentially adjustable by mechanisms such as shown in FIG. 13.

The assembled webs then proceed through the collator processing section to a so-called crash numbering mechanism 138 which can print a sequence of numbers on the uppermost paper web, and on the others by pressure through the carbon webs. Such units are similar in design and operation to the numbering unit 35 of the forms press, and are laterally and circumferentially adjustable in the same way. The webs pass to a punch mechanism 140, comparable to the press file punch 40, then through a vertical (longitudinal) perforator 142, slitters 144, and cross-perforator or cut-off cylinders 145 (depending upon the type of blade used), to the spiral folder 147 and thence to the delivery table 148. The punch and die sets are laterally and circumferentially adjustable in the same manner as the press file punch units. The slitters are laterally adjustable (as in FIG. 12) and the cross-perforator cylinder is circumferentially adjustable to locate the cross perforation CP (or a cut-off line) accurately between line feed holes LH. Finally, in the folder 147 there are lateral adjustment mechanisms for the screw members, an adjustment for fold length, and a longitudinal adjustment mechanism for the oscillating chute to locate the fold at the cross-perforation.

All of the foregoing adjustment devices are capable of automatic setting through microprocessor operated controls such as shown in FIG. 17. The makeready message for this purpose, available from computer PR-2 to the microprocessor MP-4 associated with console PMST-IV, is of the type previously set forth.

COLLATOR MAKEREADY CONTROL

The digital displays on the collator are shown schematically at 155 in FIGS. 22 and 24. These are used to indicate circumferential and lateral locations of the various adjustable mechanisms of the collator, with respect to a common zero position which is established for all these mechanisms in the sections of the collator. Since there are many similarities to the press control, same numbers in the "100" series are used on like or similar parts and devices.

The gear side pin band 125 and its associated drive wheels is fixed laterally at a predetermined spacing from wall 102 and defines the lateral or across zero position. The operator side pin band and drive wheels are movable as a unit and their location can be indicated on display 155-PB. The pin bands are driven directly from the line shaft 105, and thus can establish a circumferential zero position. An optical encoder 160 is driven from one of the pin band drive shafts and functions as a clock pulse generator. A reference pulse generator for the system, which is shown schematically in FIG. 24, is derived from a specified unique position on the pin band. A predetermined pin is marked, and when it is located at a selected one of a set of reference marks on the collator next to the pin band, the machine is set for the particular length of form to be run. The distance from the reference marks to the vertical (down) location of the cross-perf blade is fixed.

The clock outputs of the encoder and reference pulses are directed to up-down counters 162-CR, 162-I, 162-CN, 162-FP, 162-CP and 162-F and their associated logic circuits. These in turn drive the digital displays 155-CR (crimp), 155-I (impactor), 155-CN (crash numbering), 155-FP (file punch), 155-CP (cross-perf) and 155-F (folder), through microprocessors (not shown) to display the circumferential or lengthwise displacement of their mechanisms from the press zero position, in operating on the webs.

The drive for each unit requiring circumferential adjustment includes a differential (harmonic drive) 166-CR, 166-I, etc., and a corresponding stepping or pulse motor 167-CR, 167-I etc. which provides a secondary or phase adjusting input, as in the press. In the case of the folder, the motor 167-F is connected to move the exit tip of the oscillating chute in a direction lengthwise of the web. Once per revolution sensors 168-CR, 168-I etc. are actuated to provide a control pulse each time the corresponding unit acts on the webs.

For each revolution of the collator drive, the counters 162 are reset by a reference pulse, and clock pulses are counted until an output from a corresponding sensor 168 stops the count. The displays 155 show the numbers stored in counters 162 as digital values. If the collator is stopped, adjusting pulses to a stepping motor 167 will drive a pulse counter 169 up or down, and it in turn will adjust the counter 162 to update the display during adjustment.

It is understood that in actual practice several of the displays may be time-shared, but individual displays have been shown for simplification of the explanation.

COLLATOR CONSOLE

FIG. 25 shows the control and display console of the console units PMST-IV without the associated terminal which appears in FIG. 6. The lower left section of the console incorporates the Production Monitor System (PMS) controls and display, which includes a single line visual display in which the term "display" appears by way of explanation. Beneath this display there is an alpha/numeric entry keyboard, a row of control buttons, and an area in which operations code lists can be supported for convenience of the operator. Upon entry of the job number on the keyboard, the collator makeready message will be transmitted to the microprocessor PMST-IV.

The lower right area of the console includes a "total forms" counter and a switch, directly to the right of the counter, by which the operator can initiate and stop the count. To the right of this counter are on-off switches by which the operator can move the glue applicators, crimp wheels, and impact wheels between active and parked positions, and control the glue pumps. Beneath the impressions counter is a control knob to regulate collator speed along with a digital display of the running speed, usually expressed in feet per minute. To the right of the speed controls there are two push button switches, the lower being a momentary contact switch by means of which the collator drive can be jogged or inched, and the upper switch button being connected to a suitable control which holds the collator in running condition. Beneath the speed display there is a control switch for engaginq and disengaging jam detectors, and in the lower right corner there is a stop switch control for the drive which will disengage the drive upon momentary actuation.

Referring to the upper left corner of the console, there are two switches, the uppermost of which when contacted will cause the control to set the collator by bringing all adjustable mechanisms into a predetermined initializing position, which may be different from the zero position. For example, positions may be predetermined for various sections of the collator to make it most convenient for the operator to thread the webs, and to add and/or remove various items such as numbering machines, punches and dies, slitters, etc., and the marked pin on the pin bnads is brought to the proper reference position. The lower of these two buttons, when contacted, causes makeready information to be sent from microprocessor PMST-IV to the microprocessors MP-5, which in turn cause the mechanisms they control on the collator to be pre-set according to the makeready message.

The section of the console to the right of these switches includes a display, for example of the seven segment four digit type, which is utilized to display the lateral displacement of the operator side pin band, of the positions of the rolls R-1 and R-2 when the automatic side adjustments of the rolls are incorporated in the collator, and of the glue applicators. The control buttons directly below the display select whether readings are to be given for paper webs (PA) or carbon webs (CA) or the pin band (PB). The switch to the left of those control buttons is a rocker type switch of the kind which normally in a centered-off position, and when depressed in one direction moves the appropriate adjusting motor at fast or slow speed. A similar rocker switch is to the right in this section and selects forward or reverse direction of the adjustment drive. The rotary switches above buttons PA, CA and GL select which roll or glue applicator is to be adjusted. No provision is necessary for displaying circumferential displacement of these items.

There are on the collator manually operated switches of the three position type which control the supply of glue from the pump (s) to the nozzles. These switches in turn control the aforementioned diverter values. On and off positions of each switch causes the valves to move in supply and by-pass (divert) positions under manual control. The third or "auto" position for each switch turns control of the diverter valve over to the microprocessor for automatic set-up.

At the upper center of the console there is a further digital display with a symbol to the right representing a numbering machine. This display is available to show circumferential and lateral positions of the crimp wheels (CR), and impact wheels (I), and of the numbering machines (N) at the crash numbering station.

The selector buttons in the center represent the functions that can be controlled from this position. The two buttons over the letters CR provide circumferential (upper) and across (lower) adjustments at the crimp station, the two buttons over the letter I provide like functions at the impact station, and the buttons over the letters CN provide like functions for the crash numbering station. The rocker switch to the left provides fast and slow control for each, and the rocker switch to the right provides forward and reverse circumferential adjustment or for moving each toward the gear side or the operator side of the collator, as indicated by the symbols G and 0.

Finally, the upper right section of the console provides a display for showing circumferential or transverse adjustments in the processing section. Again, there is a rocker switch for fast and slow speeds and one for forward-reverse or gear-operator side movement. The control buttons beneath the display provide (left to right), control over circumferential and lateral movement of the file hole punch (FP), lateral adjustment of the vertical perforators (VP) and slitters (SL), circumferential adjustment only of the cross perforator cylinder (CP), and the final set of buttons provides for adjustment of the elements of the folder for fold length, width, and phase, in order to assure that the fold occurs along the cross perforation of the webs.

JOB ROUTING AND PROCESSING

The overall function of the system as above described can best be appreciated by considering the handling of a typical order for a quantity of forms, from the beginning of such an order. Either a salesman calls upon a customer and returns with the necessary information, or the customer may come to the printing plant and be interviewed. The initial job order is entered at the sales/clerical area into one of the terminals T-1, T-2 ... T-n, together with a job description number. It will be recalled that this number can be any alpha/numeric combination convenient to the plant, its personnel, and its equipment. This number is dedicated, thereafter, to the particular job and all data possible of digital recording is stored in memory associated with the job description number.

Assuming that only written instructions and descriptions are needed for the job, the work is first scheduled to the composition room, where an operator calls up the job description to determine if any information has been recorded in the initial entry and scheduling, and this information is verified against written instructions passed to this operator. Depending upon the complexity of the desired form, the stage of its development, and the relationship of the form to other forms previously used by the customer, it may or may not be possible to begin compilation of the job instructions with marked-up samples, marked-up or old art work, or even a sketch or new form laid out by hand. At this point begins the composition of the form on one of the terminals CT, including lines, screens, texts, entries and locations, numbering and numbering sequences, etc. Working at one of the terminals CT composition room personnel enter all of the information necessary to produce the form.

Once all the necessary information is recorded, as described in the foregoing section entitled Forms Composing System, the general appearance of the form can be called up to the editing terminal CT-E where it is observed and checked, edited if necessary, and then filed for preparation of one or more printing plates as may be necessary. This can be accomplished by calling up the job description and accompanying information to the forms composer PC-1 which produces the films necessary for the production of plates, or, as noted previously, it is possible to drive a laser plate making apparatus from this information. In either event, the necessary plates are prepared and are gathered in a job jacket (not essential) along with the printed makeready information derived at the printer P1 in the composing room; typical makeready forms are shown in FIGS. 7A and 7B for the presses and collator.

It should be noted at this point that before the plates are actually made it may be desirable to submit a proof of the same along with other job instruction information to the customer for approval. This, of course, will depend upon the nature of the job and whether such approval is necessary under the particular circumstances. If changes should be noted by the customer, the job will return to the composing room where the information will again be called to the terminals, the information displayed on the editing terminal CT-E and changes made as necessary, before the plates are made. During all of the foregoing procedures, the Production Monitor System is gathering data on the time and materials used on the job.

In any event, once the plates and makeready instructions are assembled in a job jacket, the job is scheduled for production by the production manager, using the scheduling programs available in computer PR-2. He is provided with a terminal T and printer P-2 for the purpose of checking the amount and type of work to be done, the schedule of work on the equipment according to availability, time of run required, stock and tools availability, job priority, etc. In the course of this operation the production manager may find it necessary to interrogate the stock room data, for special types or grades of paper which might have to be ordered in; the stock room also has a terminal T available for entering stock received and confirming availability. This information will be available when the production manager next calls up this particular job to check its status on his terminal.

Figure 18:
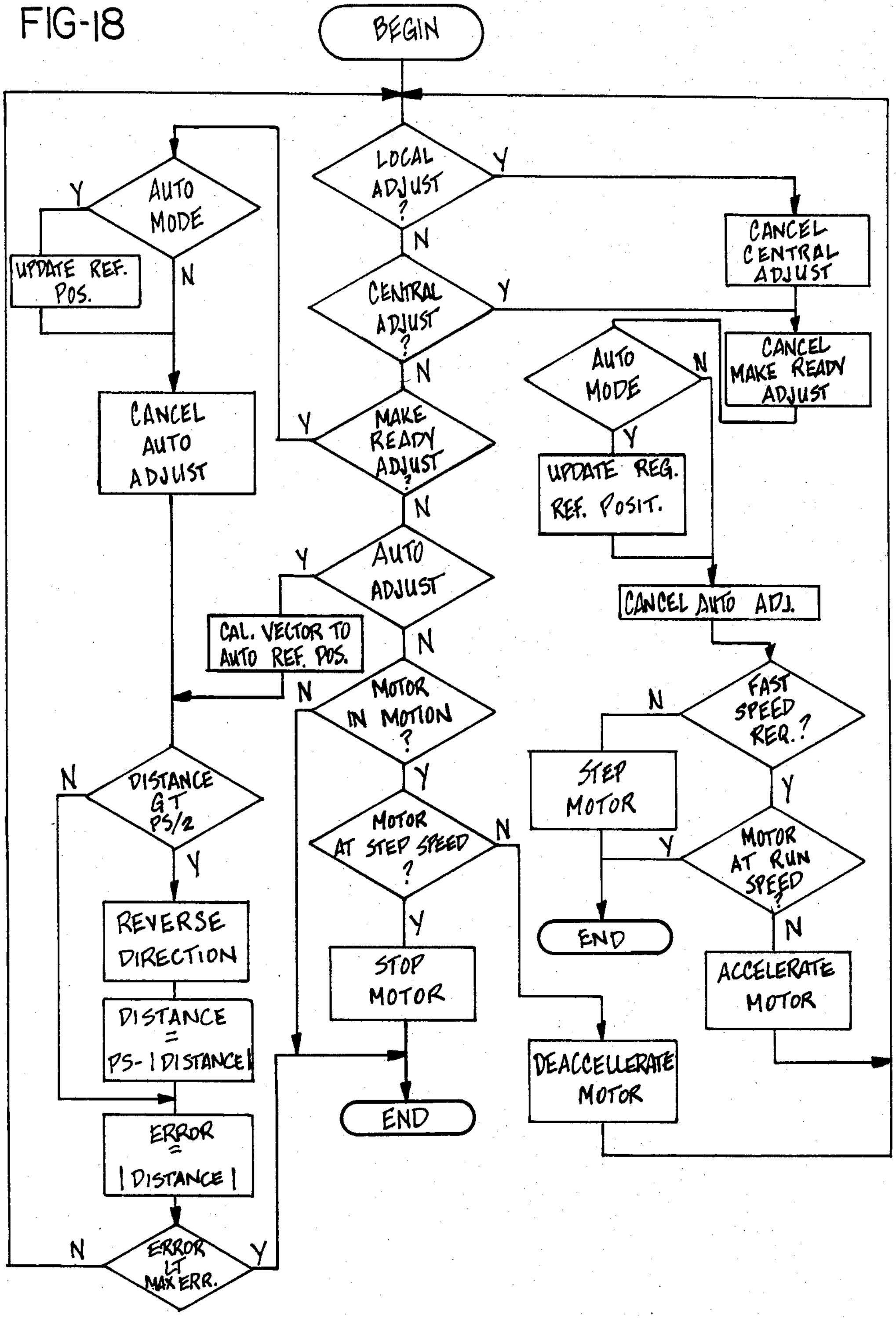
FIG. 18 is a program diagram for a typical controller.

The first step in the actual manufacturing of a multi-part form will be the printing of the various parts of the form. This may be accomplished in sequence all on the same press, or different parts may be printed on different presses according to the organization of the plant, availability of equipment, etc. In any event, the job jacket is passed to a press operator who views the same, and as his press is available, calls the job description number, and related information, up on his terminal and also causes the makeready information therein, pertinent to the part of the form he is going to print, to the console of his machine, for example console PMST-I. This causes the makeready message for the first part of the form to be transmitted to the microprocessor PMST, where the information is stored. The operator then initializes the press, the plates are hung, and numbering machines, imprint patches, slitter wheels, etc. mounted in accordance with the makeready instructions. When the equipment is ready, the operator causes the makeready information to be transferred from the microprocessor PMST to the various processors MP-5 which drive the various stepping motors and the like to set the associated controlled elements of the press to the settings digitally described in the stored information. FIG. 18 is a typical flow chart showing the functional operation of one of the stepping motors, under control of its microprocessor MP-5, to achieve a desired setting.

Figure 19:
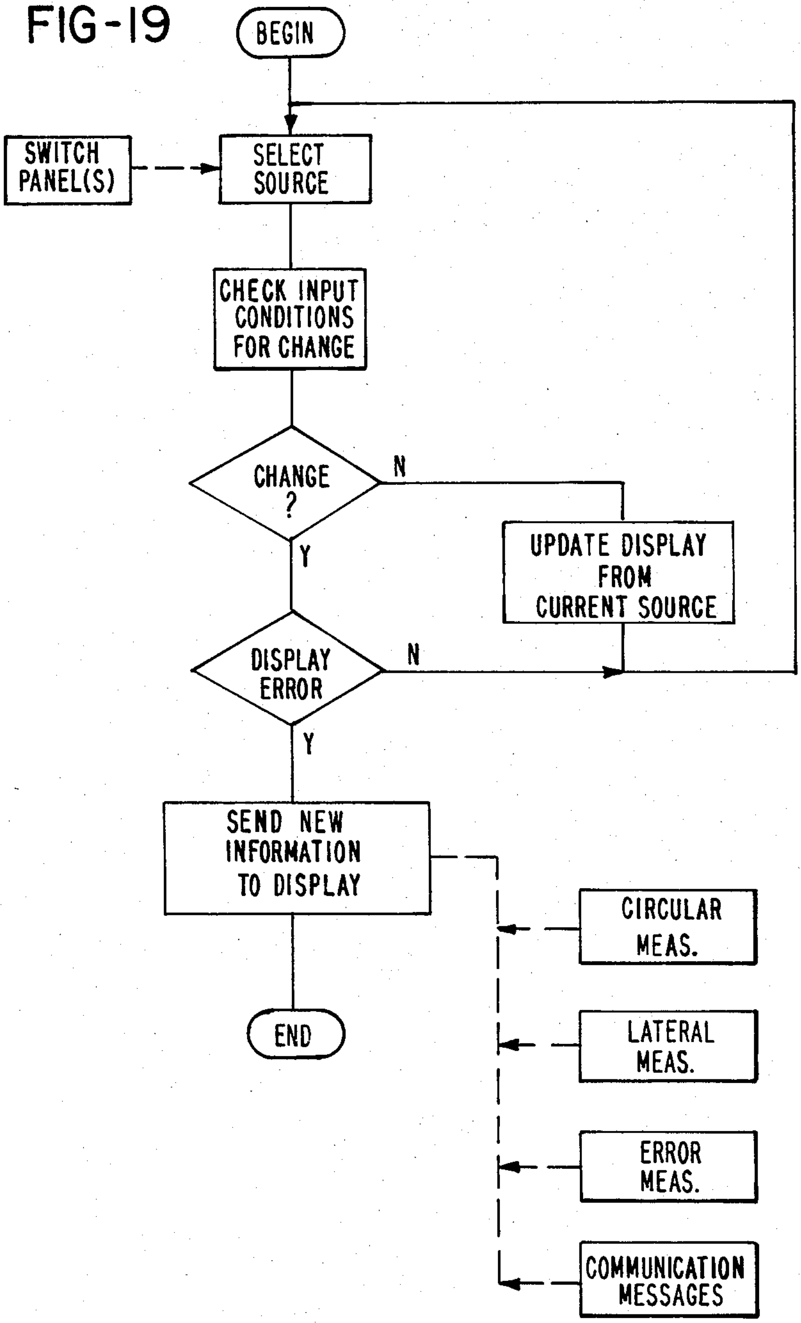
FIG. 19 is a diagram of the program for the display controls.
Figure 20:
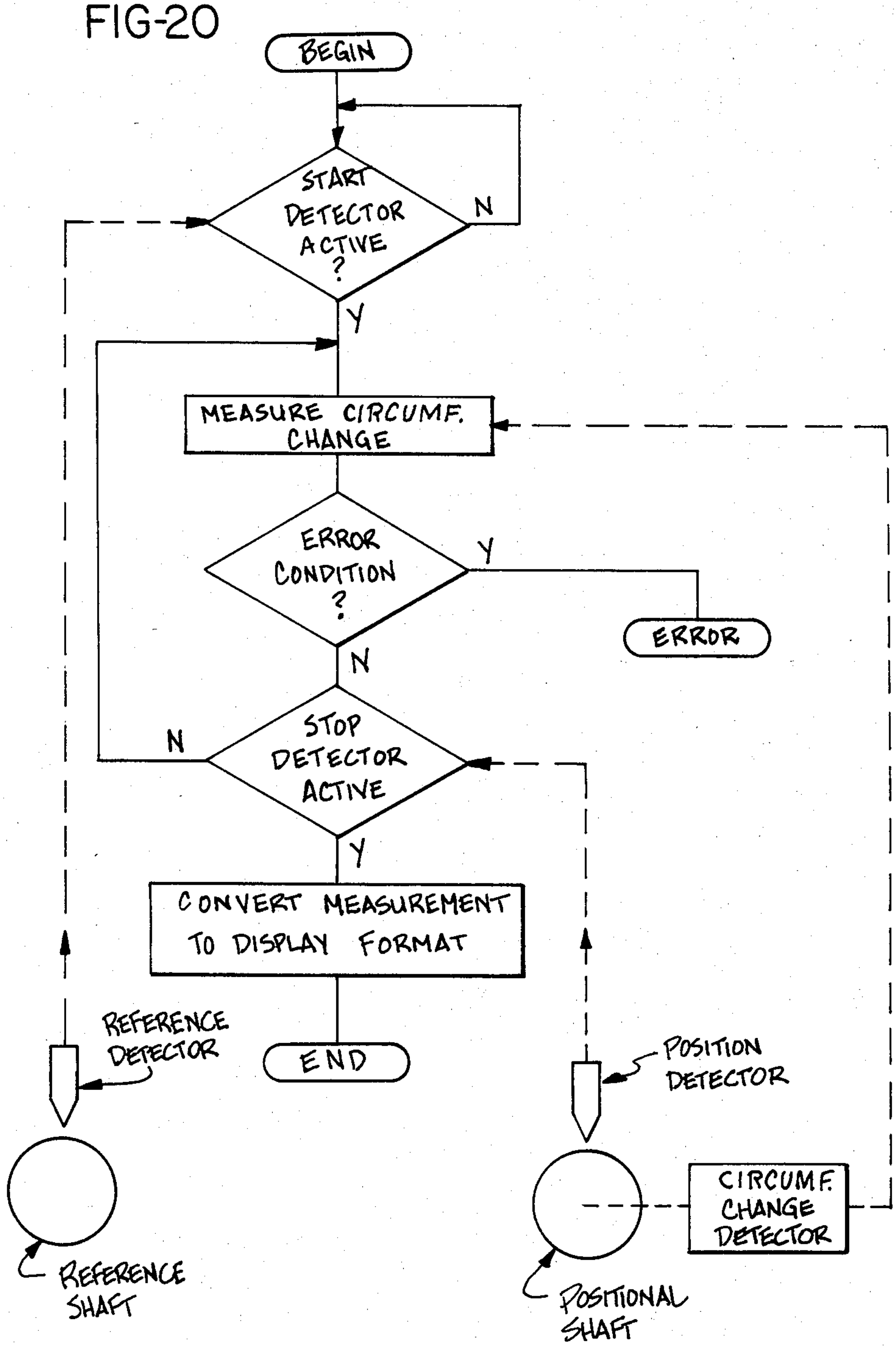
FIG. 20 is a diagram of a typical circumferential measurement program.
Figure 21:
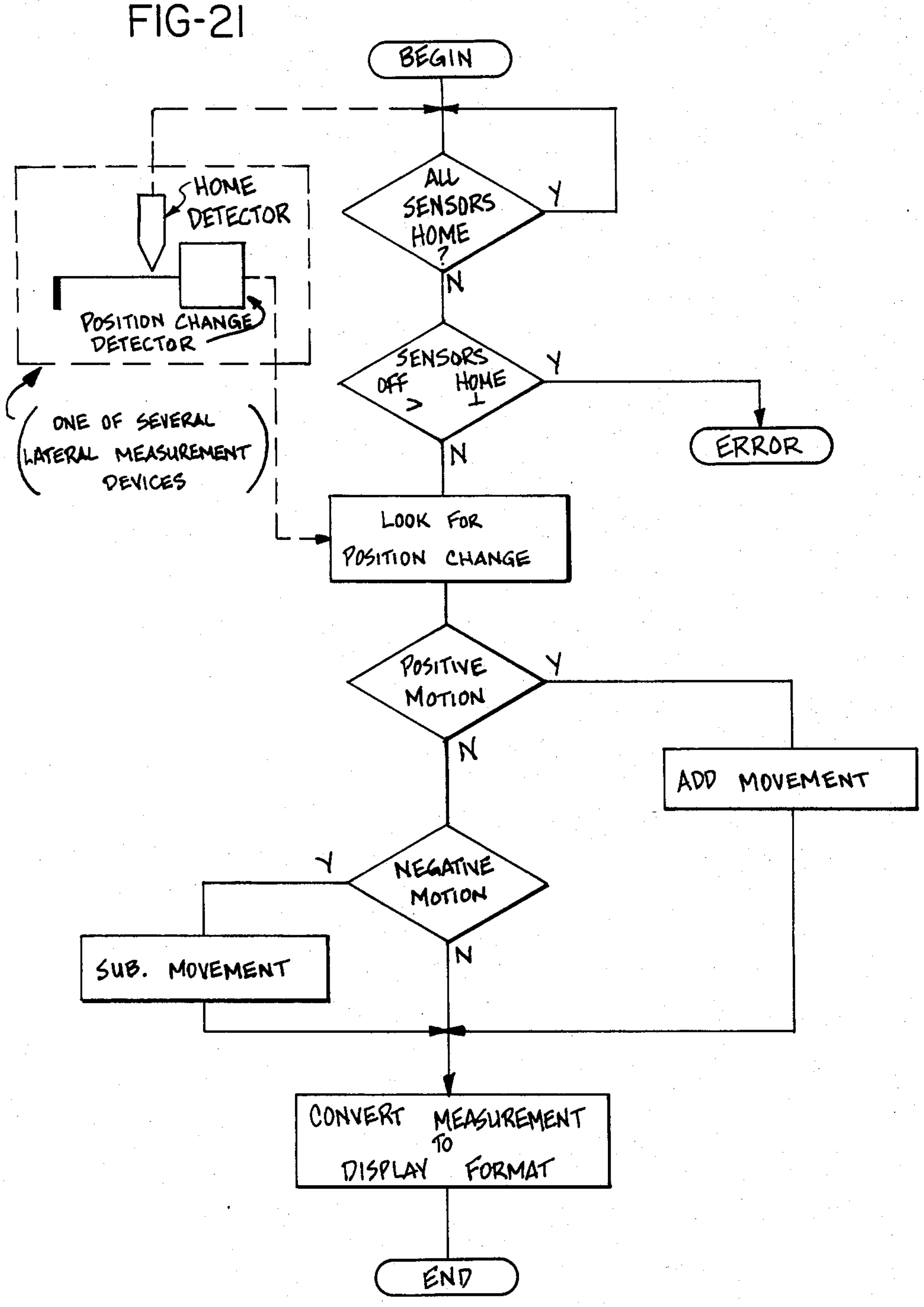
FIG. 21 is a diagram of a typical lateral measurement program.

As this makeready setup operation proceeds automatically, the displays are driven at the various sections of the press and the information is also available to the console displays, in order to give the operator an accurate visual indication of the settings of the various parts of the press. FIG. 19 is a flow diagram which explains schematically the manner in which the various displays are driven and updated. Further information about the setting of the displays for the press is previously explained in connection with FIGS. 10–14. FIGS. 20 and 21 are flow diagrams which illustrate typical operations of the microprocessors MP-5 and related stepping motors and feedback elements, in order to achieve the desired setting. It will be understood that the various devices used for feedback will vary in accordance with the section of the press and the need for circumferential and/or lateral adjustment.

Once this automated makeready setting has been completed, the operator can verify the information displayed against the printed makeready instructions in the job jacket, and the operator can make appropriate adjustments where he deems them necessary. Thus, although the system is substantially automated, the operators remain ultimately in control, and have the ability to override automatically performed settings where the judgment of the operator calls for such changes.

Assuming the press is webbed, the running phase of makeready commences, and the various sections will be essentially registered. However, the operator has available to him the trim adjustments at the various offset towers and other sections of the press. Of course, during this phase of the makeready operation the machine can be jogged or run at slow speed, and the operator can intervene as necessary, using the controls as an aid to efficient makeready adjustment of the press. Once operator approval of job registration on the web is achieved, the run is commenced, and proceeds to completion. In the case of printing one part of a multi-part form the web will be rewound on the press rather than folded or cut into sheets. The completed roll, constituting one part of the form to be produced in accordance with the job description, is then removed and stored in a location where it is ready for the ultimate assembly of the parts of the form. Printing of the other parts proceeds in the same fashion as discussed above, until all parts are finished.

During makeready and running, from the time the message is called to the console microprocessor, the Production Monitor System gathers data on the press activity at regular intervals, for example once every minute. This data is transferred to the memory, as part of the integrated data base for the job, and provides current job status information. Also, the data being in memory is protected against loss in the event of power outages, since memories conventionally include such protection.

The parts can be stored in automated, or digitally designated storage systems, where the job description number again can be utilized as a "tag" or reference to locate the various parts of the form during this temporary storage, prior to taking the finished parts to the collator. If desired, depending upon the size of the plant, an additional terminal T can be provided for the purpose of referencing the location of the various printed parts of the form.

Eventually, all of the parts having been printed, the job is ready for collating. The rolls making up the different parts of the form are retrieved and transferred to the collator, the necessary carbon webs are obtained from storage (if needed) and the various tools such as numbering machines, slitter wheels, perforation or cutoff blades, etc. may be obtained from storage if not available proximate to the collator. The job description jacket is transferred to the collator operator and his crew.

The operator calls up the job instructions on his terminal, and causes the makeready instructions for the collator to be transmitted to the microprocessor PMST at the collator console PMST-IV. He then causes the microprocessor control to setup the various adjustable units of the collator, particularly such that the pin band conveyor is properly positioned to receive the various webs making up the parts of the form. The crew mounts the various rolls and carbon rolls (if needed) and thread these through the collator into the folder, thus finishinq the initial setup phase of makeready. The operator has available to him all the automated controls with manual adjustments so he can make whatever further setting adjustments are necessary before running the job.

Once the collating task is completed, the forms, usually zig-zag folded and stacked, are taken to the shipping department where personnel have available a terminal T to call up the job description information and a printer P-3, which is available to print necessary shipping labels and other packing information as may be required to go with the job when it is packaged and shipped.

Assuming that the job is completed and shipped, this information is added into the job description data, and available to the accounting department for purposes of invoicing and other accounting procedures. All during the work on the job, management data has been gathered by the Production Monitor System, and this information is filed for management purposes on a day-by-day basis into the main data storage. This information can be used to produce production and other management reports on a regular (usually daily) basis, as well as checking the progress of work in progress.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. A process for manufacturing multi-part forms using at least one web press having one or more printing stations and one or more processing stations at which operations are performed on webs in registry with a series of printed images produced at a printing station,;

the steps comprising (a) creating a digital job description of a form including the location and content of printed images on the several parts of the form and/or the location of process items such as perforations, holes, cuts or other markings on one or more parts of the form, (b) storing said job description in a digital memory with a job identifying number, (c) using the job number from the memory to pre-set the printing sections and processing sections of a press for each part of the form, (d) producing the several parts of the form on the press or presses, and (e) assembling and completing the processing of the several parts into a quantity of multi-part forms sufficient to complete the job.

2. A process for manufacturing multi-part forms using at least one web press having one or more printing stations and one or more processing stations at which operations are performed on webs in registry with a series of printed images produced at a printing station, and also using a collator having a collating station at which job related webs from said press or presses are assembled in registry and having one or more processing stations at which additional operations are performed on the assembled webs in registry with a series of printed images thereon;

the steps comprising (a) creating a digital job description of a form including the location and content of printed images on the several parts of the form and/or the location of process items such as perforations, holes, cuts or other markings on one or more parts of the form, (b) storing said job description in a digital memory with a job identifying number, (c) creating a digital description of the images to be printed on the parts of the form, (d) storing said image descriptions in the memory associated with the job identifying number, (e) using the digital job description from the memory to pre-set the printing sections and processing sections of a press for each part of the form, (f) producing the several parts of the form on the press or presses and supplying the parts to the collator, (g) using the digital job description to pre-set the processing stations of the collator, and (h) assembling and completing the processing of the several parts on the collator into a quantity of multi-part forms sufficient to complete the job.

3. A process as defined in claims 1 or 2, including the further step of using the digital descriptions from the memory to make printing plates for use in the printing stations of a press.

4. A process as defined in claim 3, including the further step of gathering production data during the steps of creating the job description, making the printing plates, pre-setting the press and producing the form parts, or pre-setting the collator and completing processing of the forms, and storing the gathered production data in a digital memory.

5. In a forms plant including a first terminal for generating data describing the composition and arrangement of a business form, a computer receiving data from said first terminal and having at least one data output line, said computer functioning to prepare job instructions from the data, a data processor communicating with one of said data output lines and functioning to store makeready data, and a microprocessor controller receiving the makeready data from said data processor and transmitting the makeready data to a plurality of power operated adjustors on a web processing machine upon command of the operator.

6. A forms plants as defined in claim 5, also including means including a photocomposing device receiving data from said computer and functioning to produce one or more printing plates to provide a press with print information to complete part of a job.

7. A printing system comprised of:

at least one machine having a plurality of stations along a path through which web material is transported, said stations including apparatus for operating on said material to produce printed matter and related physical changes on the web material, adjustment means at certain of said stations for changing the lateral or circumferential position of the apparatus relative to the path of movement of said materials;

computer means including a memory, input means including at least one terminal and a display for inputting information including the identification of certain job parameters concerning operations to be performed on the web material and for storing the parameters in said memory;

means for storing a job number in said memory in association with the job parameters;

adjustment control means coupled to said adjustment means for controlling the position of said adjustment means in response to control signals derived from information stored in said memory; and machine control means coupled to said computer means and said adjustment control means for associating a machine with a job number and for applying the control signals to said adjustment control means for presetting the adjustment means at the machine in accordance with the job parameters in memory associated with the job number.

8. A printing system as defined in claim 7 further comprising:

production control means interfaced with said computer means for monitoring the production of printed material produced by said machine, including (a) means for receiving information concerning production runs of said machine and for determining a production run has been completed by a machine, and (b) means for supplying production run information to said computer means for storage in said memory in association with a job number.

9. A printing system as defined in claims 7 or 8 further including:

input means for supplying storeroom information, machine tooling information, material information and print color information to said computer means for storage of such information in memory in association with the job number; and output means coupled to said computer means for providing a visual display of such information for the machine crew along with the associated job number prior to application of the control signals to said adjustment control means.

10. A printing system as defined in claims 7 or 8 wherein said machine is a web press, and further including:

a collator having a plurality of stations through which a plurality of webs are adapted to be transported including a first station at which the webs are collated and subsequent stations including apparatus for operating simultaneously on said webs to produce physical changes therein;

said apparatus including collator adjustment means at certain of said stations for changing the lateral or circumferential position of the apparatus relative to the path of movement of the webs;

collator adjustment control means coupled to said collator adjustment means for controlling the position of the adjustment means and responsive to control signals derived from information stored in said memory;

means for supplying information concerning the operation of said collator for storage in said memory in association with a job number; and said machine control means being coupled to said collator adjustment control means for associating the collator with the job number and for applying control signals for presetting the collator adjustment means in accordance with job parameters in said memory associated with said job number.

11. A printing system as defined in claim 10 including:

means for supplying information concerning collator tooling to said computer means for storage in said memory means in association with said job number, and output means coupled to said computer means for providing visual display of such information along with the associated job number prior to the application of control signals to said collator adjustment control means.

12. A forms production system comprising:

data input means for determining in digital form certain parameters of the layout of a form to be produced including a computer, and a memory for storing information pertaining to the parameters concerning the content of a form and for supplying information to produce the form;

means for supplying a job number to said computer for storage in said memory in association with form content parameters stored in said memory, a machine for receiving at least one portion of said information for producing the form, including a plurality of stations arranged along a path and having apparatus for operating on web form material to be moved through the machine along such path;

said stations including adjustment means for positioning parts of the apparatus laterally or circumferentially relative to the path the material travels through the machine;

control means responsive to makeready position signals for controlling the settings of said adjustment means, and means for generating makeready position signals from said stored information and supplying such signals to said control means to preset said adjustment means in accordance with the parameters of the form to be produced.

13. A forms production system as defined in claims 12 also including:

production monitoring means for monitoring the production of printed material produced by said machine including means for receiving information concerning production runs and for terminating the production runs when they have been achieved; and means for supplying production run information to said computer for storage in said memory in association with the job number.

14. A forms production system as defined in claim 12, including production monitoring means for gathering data from said data input means and from said machine during setting of said adjustment devices, and for supplying the data to said memory in association with the job number.

15. A forms production system as defined in claim 12 including:

means for supplying storeroom information, press tooling information, material information and print color information to said computer for storage of such information in memory in association with said job number, and output means coupled to said computer for providing a visual display of information concerning press tooling, material and color, and storage information concerning supplies and/or material needed for the job along with the associated job number prior to the application of the makeready position signals to said control means.

16. Apparatus for producing forms comprising:

a machine for producing forms including means for transporting material along a given path and a plurality of stations along the path for consecutively performing repetitive operations on the material, said stations including means for operating repetitively on the material as a step in the production of a form and said stations including adjustment means for laterally and/or circumferentially adjusting the operation of the mechanisms relative to the path of travel of the material;

forms composing means for identifying certain parameters of a form to be produced relative to said adjustment means and the path of travel of the material and a memory receiving and storing such parameters from said forms composing means;

said forms composing means including a digital processor communicating with said memory, means for supplying a job number to said processor for storage in said memory in association with the parameters stored in said memory, control means for positioning the adjustment means; and computer means, responsive to a command signal, for generating position signals from the parameters stored in said memory and applying the position signals to said control means for automatically positioning the adjustment means in accordance with the specified form to be produced.

17. Apparatus for producing forms as set forth in claim 16 including:

production control means associated with said computer for monitoring and controlling the production of printed material produced by said machine including means for receiving information concerning production runs of said machine in association with a job number.

18. Apparatus for producing forms as set forth in claim 17 wherein said machine is a forms printing press and includes;

means for supplying storeroom information, press tooling information, material information and print color information to said computer for storing such information in memory in association with said job number, and output terminal means coupled to said computer for providing a visual display of information concerning press tooling, material and color, along with the associated job number prior to the application of the control signals to said adjustment control means.

19. Apparatus for producing forms as set forth in claim 16 wherein said machine is a collator in which a plurality of printed webs are to be collated;

means for supplying information concerning printed material on the webs and collator tooling information to said computer for storage in said memory in association with a job number, and output terminal means coupled to said computer for providing visual display of information concerning collator tooling and printed material to be collated along with an associated job number prior to the application of position signals to said adjustment control means.

20. Apparatus for producing forms as set forth in claim 16 including:

production control means associated with said computer for monitoring and controlling the production of printed material produced by said machine including means for receiving information concerning the operation of said forms composing means, and means for storing such information in said memory.

21. A printing system comprising:

a plurality of printing presses, each having a plurality of stations along a predetermined path through which web material is transported, each of said stations including mechanism for operating repetitively on the material to produce printed matter or related physical changes on the material, certain of said stations including adjustment means for locating the lateral or circumferential position of the mechanism relative to the predetermined path of movement of said material;

a plurality of adjustment control means, a separate one of each of said adjustment means, each of said adjustment control means being responsive to control signals for controlling the position of its connected adjustment means;

a plurality of processors, a separate one for each of said printing presses, coupled to each of the adjustment control means on its respective press for providing control signals thereto to position the associated adjustment means;

editing means having a visual display for designing the layout of information to be printed and including means for identification of certain parameters for use in presetting said press adjustment means according to a desired layout, which parameters along with the information to be printed and an associated job identification number are adapted to be stored;

circuit means coupled to said editing means for supplying said print information in digital form for use in plate making;

a central computer including a memory, coupled to said editing means for receiving and storing the parameters in the memory with the associated job number;

terminal means coupled to said central computer for supplying information concerning production, supply and tooling for storage in said central computer memory in association with the corresponding job number; and circuit means coupling said central computer to each of said plurality of press processors for supplying the parameters from memory to a selected press and to enable said press processor to automatically preset said adjustment means in accordance with said parameters.

22. A printing system as defined in claim 22 including:

production control means for each of said presses connected to monitor the production of printed material produced by said presses, including means for receiving information concerning production runs for said presses and for terminating a production run which has been achieved by a press; and means for supplying production run information to said central computer means for storage in the memory of a press computer in association with a job number.

23. A printing system as defined in claim 23 including:

wherein said production control means at said press includes means subject to command for determining the status of the press including maderead y, stop, maintenance and time to complete production run and providing information concerning the press status to said central computer, and wherein said central computer analyzes the press status information in selecting the press for a job.

24. In a machine for performing processing operations on a web of material, said machine comprising a plurality of stations arranged to define a path along which the web is transported, rotary mechanisms at said stations functioning to perform repetitive operations on the passing web, a drive for operating said rotary mechanisms in synchronism, including means defining a rotary zero position of the drive, means for connecting said rotary mechanism to said drive and providing for limited rotary displacement of selected ones of said rotary mechansims relative to the rotary zero position, means for establishing a lateral zero position relative to said web path, adjustable mounting means for supporting at least some of said rotary mechanisms for lateral displacement relative to said lateral zero position;

the improvement comprising first power operated adjustment means incorporated in said means for connecting, second power operated adjustment means incorporated in said adjustable mounting means, control means for receiving makeready adjustment information and connected to both said adjustment means to cause predetermined displacements of the rotary mechanisms relative to the rotary and lateral zero positions;

a layout device coordinated to said adjustment means and including means for locating the layout of a form or forms to the available operating area of the rotary mechanisms, means in said layout device operable to generate parameters of a form layout as digital displacment instruction signals compatible to said control means, and means for transmitting such instruction signals to said control means during makeready operation of said machine.

25. A machine as defined in claim 24, including digital indicator means driven from said adjustment means and operable to display a numerical indication of lateral and rotary displacement of said adjustment means.

26. In a forms plant including departments for production supervision, sales/estimating, composition, accounting, a manufacturing department having at least one forms press and one collator, a supply department tor storing ink, paper, and other supplies and including a receiving area, and a shipping department; the improvement comprising a computer including a CPU, a memory providing means for storing an integrated data base for jobs, and a plurality of terminals for use by the departments to enter order and design information, job instructions, and the like under a job identification code;

an interactive control for the press and the collator including an operator console, a mcroprocessor controller, power operated adjustors on the press and the collator and drivable by said controller, and means on the press and the collator providing feedback data to said controller; and means providing data communication between said computer and said controller, whereby a unique data base may be created in said memory for each form manufacturing job and may be utilized and/or added to by each department as the job progresses through the plant.

* * * * *